United States Patent
Hanamura et al.

(10) Patent No.: US 6,587,508 B1
(45) Date of Patent: Jul. 1, 2003

(54) APPARATUS, METHOD AND COMPUTER PROGRAM PRODUCT FOR TRANSCODING A CODED MOVING PICTURE SEQUENCE

(75) Inventors: Tsuyoshi Hanamura, Tokyo (JP); Hiroyuki Kasai, Tokyo (JP); Satoshi Nishimura, Tokyo (JP); Hideyoshi Tominaga, c/o Global Information and Telecommunication Institute, Waseda University, 3-10, Nishi-Waseda 1-chome, Shinjuku-ku, Tokyo (JP)

(73) Assignees: Media Glue Corporation, Tokyo (JP); Hideyoshi Tominaga, Tokyo (JP)

( * ) Notice: Subject to any disclaimer, the term of this patent is extended or adjusted under 35 U.S.C. 154(b) by 367 days.

(21) Appl. No.: 09/604,973

(22) Filed: Jun. 28, 2000

(30) Foreign Application Priority Data

Jun. 30, 1999 (JP) .......................................... 11-186457
Sep. 14, 1999 (JP) .......................................... 11-260994
Sep. 30, 1999 (JP) .......................................... 11-278867

(51) Int. Cl.$^7$ ............................. H04B 1/66; G06K 9/32; H04N 11/02
(52) U.S. Cl. .......................... 375/240.24; 375/240.02; 382/298; 348/404.1
(58) Field of Search ...................... 375/240.24, 240.03, 375/240.01, 240.04, 240.26, 240.29, 242, 245, 372, 240.02; 382/251, 233, 298; 341/50; 370/468; 348/405.1, 404.1, 409.1, 441, 397.1

(56) References Cited

U.S. PATENT DOCUMENTS 5,805,220 A * 9/1998 Keesman et al. ...... 375/240.01
5,805,224 A * 9/1998 Keesman et al. ...... 375/240.04
6,058,143 A * 5/2000 Golin .................... 375/240.16
6,208,688 B1 * 3/2001 Seo et al. ............... 375/240.03
6,226,328 B1 * 5/2001 Assuncao ............... 375/240.26
6,259,741 B1 * 7/2001 Chen et al. ............. 375/240.26
6,310,915 B1 * 10/2001 Wells et al. ............ 375/240.03

OTHER PUBLICATIONS

Werner, Oliver, "Requantization For Transcoding of MPEG–2 Intraframes," IEEE Transactions On Image Processing, vol. 8, No. 2, Feb. 1999, pp. 179–191.
Nakajima, Yasuyuki, et al., "Rate Conversion Of MPEG Coded Video By Requantization," ICIP 1995, pp. 408–411.
Werner, Oliver, "Generic Quantiser For Transcoding Of Hybrid Video," Proc. Picture Coding Symp. 1997, Berlin, Germany, pp. 401–406.

* cited by examiner

*Primary Examiner*—Gims S. Philippe
(74) *Attorney, Agent, or Firm*—Richard L. Aitken; Venable

(57) ABSTRACT

An apparatus for transcoding a coded moving picture sequence according to the present invention comprises a rate controller for adapting the scaling factor to perform the rate control over the coded moving picture sequence signal having a desired target bit rate. The rate controller of the apparatus has: a remaining bit computing unit for computing: a remaining number of inputting bits $R_{in}(n)$ for each of the pictures in the first coded moving picture sequence signal on the basis of the number of real inputting bits $S_{in}(n)$ of the current picture and the estimated number of inputting bits; and a remaining number of outputting bits $R_{out}(n)$ for each of the pictures in the second coded moving picture sequence signal on the basis of the number of real outputting bits $S_{out}(n)$ of the current picture and the estimated number of outputting bits; a target ratio computing unit for computing, for each of the pictures, a target ratio of the remaining number of outputting bits $R_{out}(n)$ to the remaining number of inputting bits of the picture $R_{in}(n)$; and a scaling factor computing unit for computing the scaling factor on the basis of the target ratio to control the target bit rate of the second coded moving picture sequence signal.

15 Claims, 17 Drawing Sheets

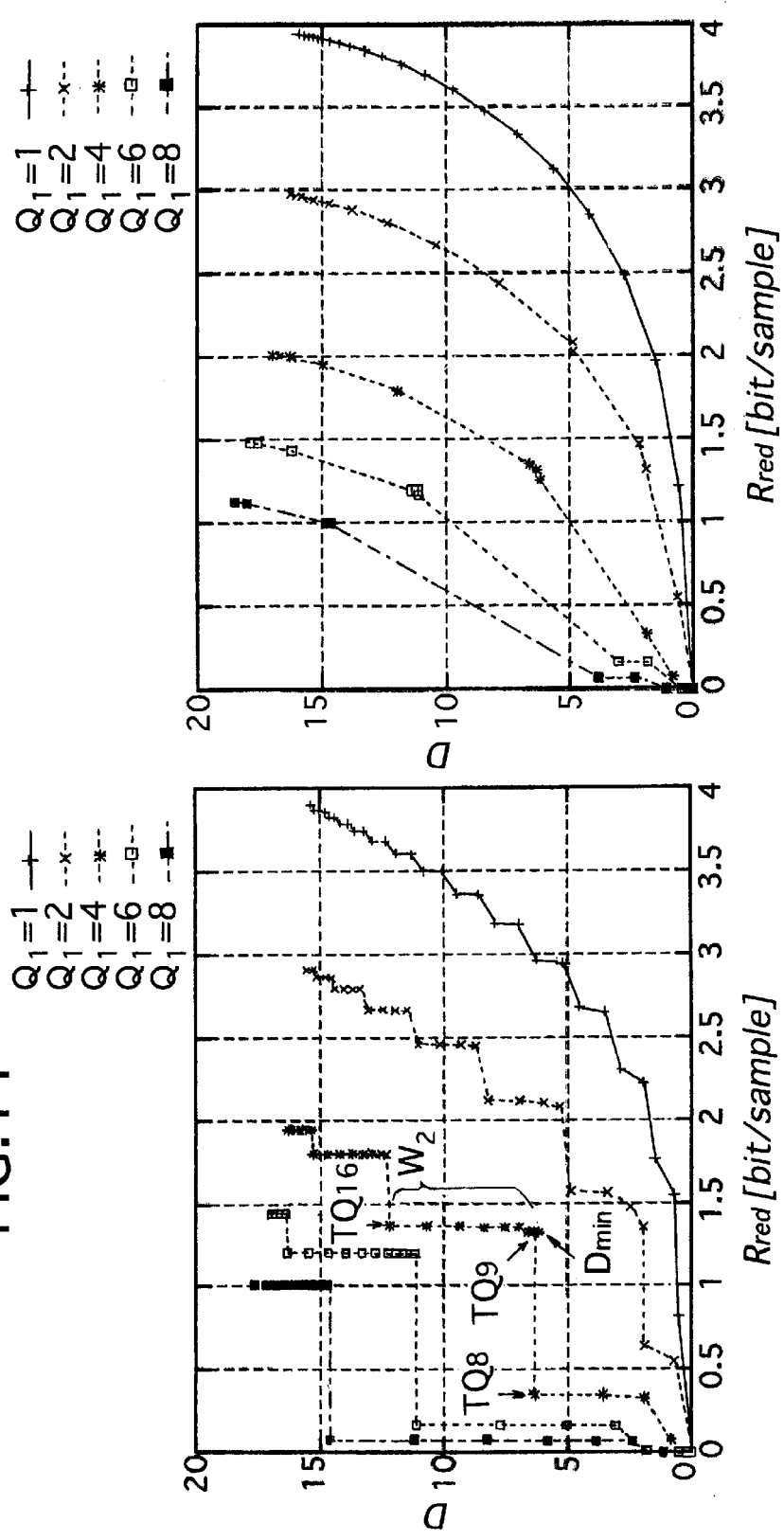

APPARATUS, METHOD AND COMPUTER PROGRAM PRODUCT FOR TRANSCODING A CODED MOVING PICTURE SEQUENCE

BACKGROUND OF THE INVENTION

1. Field of the Invention

The present invention relates to an apparatus, method and computer program product for transcoding a coded moving picture sequence, and more particularly, to an apparatus, method and computer program product for converting a first coded moving picture sequence signal in the form of bit streams transmitted at a first bit rate into a second coded moving picture sequence signal in the form of bit streams transmitted at a second bit rate lower than the first bit rate by adapting a quantization parameter to perform the effective real timely rate control over the second coded moving picture sequence signal with low delay.

2. Description of the Related Art

There has so far been proposed a wide variety of systems for compressing and encoding a moving picture having a considerable large data to produce a coded moving picture sequence signal. The international standard, ISO-IEC 13818-2, was created for a system operable to encode a digital video signal associated with a digital audio signal and commonly called "Moving Picture Expert Group Phase 2", i.e., "MPEG-2". In such encoding system, the coded moving picture sequence signal is outputted in the form of bit streams. In particular, the bit streams conformable to above MPEG-2 standard will be referred to as "MPEG-2 bit streams" hereinlater. Recently, the system of this type becomes more utilizable for various technical fields, such as a communicating system, a television broadcasting system, and so on.

The above MPEG-2 bit streams have a hierarchical structure consisting of: in turn, a top, sequence layer, a GROUP OF PICTURES layer, a picture layer; a slice layer; a macroblock layer; and a low, block layer.

According to the MPEG-2 standard, a typical encoder is operable to employ the following method of compressing and encoding a moving picture. The method comprises the steps of:

(a) inputting the moving picture sequence consisting of a series of pictures;

(b) temporally storing the pictures as frames in memories, respectively;

(c) computing a difference between one frame and another frame to eliminate redundancy in a time axis direction; and (d) orthogonal transforming, e.g., discrete cosine transforming (DCT), a plurality of picture elements within each of the frames to eliminate redundancy in a spatial axis direction.

The encoder thus constructed can compress and encode the moving picture to generate and output the coded moving picture sequence signal in the form of the MPEG-2 bit streams through a transmitting path at a predetermined bit rate. The coded signal is then transmitted from the encoder to a decoder which is adapted to decode the coded signal to reproduce the moving picture. The typical decoder is operated to employ so-called bi-directionally predicting method which comprises the steps of:

(a) storing one reproduced picture, generally referred to as "intra-picture", i.e., "I-picture", in a first frame memory;

(b) estimating another picture generally referred to as "predictive-picture", i.e., "P-picture", followed by the I-picture, on the basis of the information on a difference between I-picture and P-picture;

(c) storing the estimated picture in a second frame memory; and (d) estimating further another picture interposed between the I-picture and P-picture, generally referred to as "bi-directionally predictive-picture", i.e., "B-picture".

Here, the I-picture is encoded independently of the other types of pictures, so that the I-picture can be reproduced as a static image only by itself. The P-picture can be predicted on the basis of the I-picture or P-picture located on a position prior to this P-picture to be encoded.

In the above encoder, the volume of information on the coded moving picture sequence signal is, however, variable, in particularly, remarkably increased in accordance with a change of scene. The decoder is generally provided with an input buffer for receiving the coded moving picture sequence signal from the encoder. The input buffer of the decoder, however, has a limited storage capacity. Therefore, when a large number of bits of the coded moving picture sequence signal is transmitted from the encoder to the decoder, the input buffer overflows with the large number of bits of the coded moving picture sequence signal thereby making the decoder hard to process the coded moving picture sequence signal. In order to transmit such coded moving picture sequence signal having a variable volume of information on the transmitting path at a predetermined invariable bit rate and to enable any decoders to receive the coded moving picture sequence signal, the encoder comprises: an output buffer for temporally storing the coded moving picture sequence signal before transmitting the coded moving picture sequence signal on the transmitting path; and a rate controller for controlling the volume of information on the coded moving picture sequence signal stored in the output buffer so as to keep the volume of information on the coded moving picture sequence signal from exceeding the volume of the buffer and then to control the bit rate of the coded moving picture sequence signal.

A typical rate controlling method in MPEG-2 standard is described in "ISO-IEC/JTC1/SC29/WG11/N0400 Test Model 5", April, 1993, hereinlater referred to as "TM-5". According to the TM-5, the rate controlling method comprises the steps of:

(I) allocating a target bit by estimating the number of bits available to code the next picture before coding the current picture;

(II) computing the reference value of the quantization parameter used for the quantization of each of macroblocks in the current pictures by means of a "virtual buffer" to perform the rate control; and (III) modulating the reference quantization parameter in accordance with the spatial activity in the macroblock.

Furthermore, there are many types of decoders, for instance, one is designed to decode the coded signal having a specific format different from that of MPEG-2 bit streams, and another is connectable to a transmitting path having a different bit rate. These types of decoders are therefore required to provide with an apparatus, so-called transcoder, for converting a bit rate of the MPEG-2 bit streams into another appropriate coded moving picture sequence signal. The coded moving picture sequence signal can be transmitted to any types of decoders from the encoder via an appropriate transcoder.

Referring to FIG. 13 of the drawings, there is shown one typical type of the conventional transcoders as a first conventional transcoder 50. The conventional transcoder 50 has an input terminal $a_1$ electrically connected to a first transmitting path, not shown, and an output terminal $a_2$ electrically connected to a second transmitting path, not shown. The conventional transcoder 50 is designed to input first bit streams $b_1$ at a predetermined input bit rate through the input terminal $a_1$, to convert the first bit streams $b_1$ into second bit streams $b_2$ to be output at a predetermined output bit rate, i.e., a target bit rate, lower than the input bit rate of the inputted first bit streams $b_1$, and to then output the second bit streams $b_2$ through the output terminal $a_2$. The conventional transcoder 50 comprises a variable length decoder 51, referred to as "VLD" in the drawings, a de-quantizer 53, referred to as "IQ" in the drawings, a quantizer 55, referred to as "Q" in the drawings, a variable length encoder 57, referred to as "VLC" in the drawings, and a rate controller 59.

The variable length decoder 51 is electrically connected to the input terminal $a_1$ and designed to decode a coded moving picture sequence signal within the first bit streams $b_1$ inputted through the input terminal $a_1$ to reconstruct an original picture data for each of pictures including a matrix of original quantization coefficients, referred to as "level", for each of macroblocks within each of the pictures and an original quantization parameter, hereinlater referred to as "first quantization parameter $Q_1$".

The de-quantizer 53 is electrically connected to the variable length decoder 51 and designed to input the matrix of original quantization coefficients level from the variable length decoder 51 and the first quantization parameter $Q_1$. The de-quantizer 53 is further designed to inversely quantize the inputted matrix of original quantization coefficients level with the first quantization parameter $Q_1$ to generate a matrix of de-quantization coefficients, referred to as "dequant", i.e., DCT coefficients, for each of macroblocks as follows:

$$dequant = \{2 \times level + sign(level)\} \times \frac{Q_1 \times QM}{32} \quad \text{or} \quad \text{equation (1)}$$

$$dequant = level \times \frac{Q_1 \times QM}{16} \quad \text{equation (2)}$$

where the equation (1) is used for the inter macroblock, while the equation (2) is used for the intra macroblock. QM is a matrix of quantization parameters stored in a predetermined quantization table. The first quantization parameter $Q_1$ and the matrix of quantization parameters QM are derived from the inputted first bit streams $b_1$ by the decoder 51. Here, the original quantization coefficients level, the de-quantization coefficients dequant, the matrix of quantization parameters QM, and the first quantization parameter $Q_1$ are integers. The de-quantization coefficients dequant calculated by the equations (1) and (2) should be rounded down to the nearest one.

The quantizer 55 is electrically connected to the de-quantizer 53 and designed to input the matrix of de-quantization coefficients dequant from the de-quantizer 53 and then quantize the inputted matrix of de-quantization coefficients dequant for each of macroblocks with a second quantization parameter, referred to as "$Q_2$" hereinlater, to generate a matrix of re-quantization coefficients, referred to as "tlevel", as follows:

$$tlevel = dequant \times \frac{16}{Q_2 \times QM} \quad \text{or} \quad \text{equation (3)}$$

$$tlevel = dequant \times \frac{16}{Q_2 \times QM} + sign(dequant) \times \frac{1}{2} \quad \text{equation (4)}$$

where the equation (3) is used for the inter macroblock, while the equation (4) is used for the intra macroblock. The second quantization parameter $Q_2$ is obtained by the rate controller 59. Here, the re-quantization coefficients tlevel and the second quantization parameter $Q_2$ are also integers. The re-quantization coefficients tlevel calculated by the equations (3) and (4) should be rounded down to the nearest one. Such rounding operation for the integers will be omitted from the later description for avoiding tedious repetition.

The variable length encoder 57 is electrically connected to the quantizer 55 and designed to input the re-quantization coefficients level from the quantizer 55 and then encode the inputted matrix of the re-quantization coefficients tlevel to generate an objective picture data for each of pictures to sequentially output the objective picture data in the form of the second bit streams $b_2$ through the output terminal $a_2$. The variable length encoder 57 is further electrically connected to the variable length decoder 51 and designed to input a diversity of information included in the first bit streams $b_1$ necessary for the second bit streams $b_2$ from the variable length decoder 51.

The rate controller 59 is electrically connected to the de-quantizer 53 and designed to perform a rate control over the encoding in the conventional transcoder 50 according to the TM-5 on the basis of the information obtained from the de-quantizer 53 as described below.

Referring to FIG. 14 of the drawings, there is shown a flowchart of the rate controlling process according to TM-5 in the conventional transcoder 50. As shown in FIG. 14, the rate controlling process comprises steps A1 to A14.

In the step A1, "1" is assigned to the picture number variable n representing a serial number of pictures within the first bit streams $b_1$. Hereinlater, the n-th picture in the first bit streams $b_1$ is referred to as "pic(n)".

In the following step A2, a global complexity measure $X_i$, $X_p$, or $X_b$ for the corresponding type of pictures, i.e., I, P or B-picture is computed as follows:

$$X_i = S_i \times Q_i \quad \text{equation (5)}$$

or $$X_p = S_p \times Q_p \quad \text{equation (6)}$$

or $$X_b = S_b \times Q_b \quad \text{equation (7)}$$

where $S_i$, $S_p$, or $S_b$ is the number of bits generated by encoding I, P or B-picture, and $Q_i$, $Q_p$, or $Q_b$ is the average quantization parameter computed by averaging the actual quantization values used during the quantization of the all macroblocks within I, P or B-picture. The average quantization parameters $Q_i$, $Q_p$, and $Q_b$ are normalized within a range of 1 to 31. The average quantization parameters $Q_i$, $Q_p$, and $Q_b$ respectively correspond to the first quantization parameters $Q_1$ obtained from the variable length decoder 51.

The global complexity measure $X_i$, $X_p$, or $X_b$ of the corresponding picture is inversely proportional to the compressing ratio of the moving picture, namely, a ratio of the volume of information in the second bit streams $b_2$ to that in the first bit streams $b_1$. Namely, as the volume of information on the first bit streams $b_1$ becomes larger, the compressing ratio is decreased. Therefore, the global complexity measure $X_i$, $X_p$, or $X_b$ of the corresponding picture becomes larger, as the compressing ratio is decreased. In contrast, the global complexity measure $X_i$, $X_p$, or $X_b$ of the corresponding picture becomes smaller, as the compressing ratio is increased.

The initial value of global complexity measure $X_i$, $X_p$, or $X_b$ of the corresponding picture is given as follows:

$$X_i=160\times \text{Target\_Bitrate}/115 \qquad \text{equation (8)}$$

or $$X_p=60\times \text{Target\_Bitrate}/115 \qquad \text{equation (9)}$$

or $$X_b=42\times \text{Target\_Bitrate}/115 \qquad \text{equation (10)}$$

where Target_Bitrate is measured in bits/s and corresponds to the target bit rate of the first conventional transcoder 50.

In the following step A3, the target number of bits for the next picture in the current GROUP OF PICTURES $T_i$, $T_p$, or $T_b$ is computed as:

$$T_i = \frac{R}{1 + \frac{N_p X_p}{X_i K_p} + \frac{N_b X_b}{X_i K_b}} \quad \text{or} \qquad \text{equation (11)}$$

$$T_p = \frac{R}{N_p + \frac{N_b K_p X_b}{K_b X_p}} \quad \text{or} \qquad \text{equation (12)}$$

$$T_b = \frac{R}{N_b + \frac{N_p K_b X_p}{K_p X_b}} \qquad \text{equation (13)}$$

where $N_p$ and $N_b$ are the remaining number of P-pictures and B-pictures, respectively, remaining the current GROUP OF PICTURES in the encoding order. $K_p$ and $K_b$ are universal constants dependent on the quantization matrices. When it is assumed that $K_p=1.0$ and $K_b=1.4$, the quality of the image can be always optimized.

In the following step A4, the judgment is made whether the picture number variable n is "1" or not, i.e., the current picture is the first picture pic(1) or not. When the answer is "YES", i.e., the current picture is the first picture pic(1), the step A4 goes to the step A5. When, on the other hand, the answer is "NO", i.e., the current picture is not the first picture, the step A4 goes to the step A6. In the step A5, the remaining number of bits assigned to the GROUP OF PICTURES R is initialized according to the following equation (14). This remaining number of bits assigned to the GROUP OF PICTURES R is computed before encoding the first pictures pic(1) within the GROUP OF PICTURES, i.e., an I-picture, as follows:

$$R=\text{Target\_Bitrate}\times NPIC/\text{picture\_rate}+R \qquad \text{equation (14)}$$

where NPIC is the total number of pictures in each of the GROUP OF PICTURES, and picture_rate is expressed in the number of decoded pictures per second. At the start of the sequence R=0.

In the step A6, the above remaining number of bits assigned to the GROUP OF PICTURES R is updated before encoding the current picture pic(n) as follows:

$$R=R-S_i \qquad \text{equation (15)}$$

or $$R=R-S_p \qquad \text{equation (16)}$$

or $$R=R-S_b \qquad \text{equation (17)}$$

where $S_i$, $S_p$, or $S_b$ is the number of bits generated in the previous picture pic(n−1) of the corresponding type (I, P or B) just encoded.

The step A5 or A6 goes to the step A7 wherein "1" is assigned to the macroblock number variable j (j>=1) representing a serial number of macroblocks within one of the pictures. Hereinlater the j-th macroblock in the picture is referred to as "MB(j)".

In the following step A8, the fullness of appropriate virtual buffer $d_i(j)$, $d_p(j)$ or $d_b(j)$ is computed depending on the picture type before encoding macroblock MB(j) as follows:

$$d_i(j) = d_i(0) + B(j-1) - \frac{T_i \times (j-1)}{NMB} \quad \text{or} \qquad \text{equation (18)}$$

$$d_p(j) = d_p(0) + B(j-1) - \frac{T_p \times (j-1)}{NMB} \quad \text{or} \qquad \text{equation (19)}$$

$$d_b(j) = d_b(0) + B(j-1) - \frac{T_b \times (j-1)}{NMB} \qquad \text{equation (20)}$$

where B(j−1) is the number of bits generated by encoding all macroblocks in the picture up to including (j−1)th macroblock MB(j−1). NMB is the total number of macroblocks in the picture. $d_i(j)$, $d_p(j)$, or $d_b(j)$ is a fullness of virtual buffer at the j-th macroblock MB(j) for I, P, or B-picture.

$d_i(\mathbf{0})$, $d_p(\mathbf{0})$, or $d_b(\mathbf{0})$ is an initial fullness of virtual buffer for I, P, or B-picture and given by:

$$d_i(\mathbf{0})=10\times r/31 \qquad \text{equation (21)}$$

or $$d_p(\mathbf{0})=K_p \times d_i(\mathbf{0}) \qquad \text{equation (22)}$$

or $$d_b(\mathbf{0})=K_b \times d_i(\mathbf{0}) \qquad \text{equation (23)}$$

where r is referred to as "reaction parameter" and, used for the control of a reaction rate of the loop of feed back as follows:

$$r=2\times\text{Target\_Bitrate}/\text{picture\_rate} \qquad \text{equation (24)}$$

The final fullness of the virtual buffer $d_i(NMB)$, $d_p(NMB)$, or $d_b(NMB)$ of the NMB-th macroblock MB(NMB) of the current picture pic(n) is used as $d_i(\mathbf{0})$, $d_p(\mathbf{0})$, or $d_b(\mathbf{0})$ for encoding the first macroblock MB(1) within the next picture pic(n+1) of the same type.

In the following step A9, the reference quantization parameter Q(j) for the j-th macroblock MB(j) in each of pictures is computed on the basis of the above virtual buffer fullness d(j) as follows:

$$Q(j)=d(j)\times 31/r \qquad \text{equation (25)}$$

Here, the reference quantization parameter Q(j) is identical with the aforesaid second quantization parameter $Q_2$.

In the following step A10, the j-th macroblock MB(j) is quantized with the reference quantization parameter Q(j) computed in the step A9. In the following step A11, the macroblock number variable j is incremented by 1. The step A11 goes to the step A12 wherein the judgment is made whether the macroblock number variable j is more than the total number of macroblocks NMB within the nth picture pic(n) or not. When the answer is "NO", i.e., the macroblock number variable j is less than the total number of macroblocks NMB, the control is returned from the step A12 to the step A8. When, on the other hand, the answer is "YES", i.e., the macroblock number variable j exceeds the total number of macroblocks NMB, the step A12 goes to the step A13.

The macroblock number variable j thus serves as a loop counter for repeating the steps A8 to A11 to encode all the macroblocks MB(j) in the present picture pic(n). The entire macroblocks, the first macroblock MB(1) up to the NMB-th macroblock MB(NMB), in the nth picture pic(n) can be thus encoded in turn.

In the step A13, the picture number variable n is incremented by 1. Then the step A13 goes to the step A14 wherein the judgment is made whether the picture number variable n is more than the total number of pictures NPIC or not. When the answer is "NO", i.e., the picture number variable n is less than the total number of pictures NPIC, the control is returned from the step A14 to the step A2. When, on the other hand, the answer is "YES", i.e., the picture number variable n exceeds the total number of pictures NPIC, this routine of the rate controlling process is terminated. The picture number variable n thus serves as a loop counter for repeating the steps A2 to A13 to process all the pictures pic(n) in the present GROUP OF PICTURE. The entire pictures, the first pictures pic(1) up to the NPIC-th picture pic(NPIC), in the present GROUP OF PICTURE can be therefore processed in turn.

The aforesaid conventional transcoder 50, however, has no information on the structure of GROUP OF PICTURES, such as a picture rate of I or P-pictures within each of the GROUP OF PICTURES, so that the transcoder 50 must estimate the structure of GROUP OF PICTURES within the inputted moving picture sequence to allocate bits for each type of pictures within the estimated structure of GROUP OF PICTURES.

Furthermore, the first conventional transcoder 50 is required to decode the first bits streams $b_1$ almost all over the layers, such as the sequence layer, the GROUP OF PICTURES layer, the picture layer, the slice layer, and the macroblock layer in order to derive necessary data for transcoding from the first bits streams $b_1$. This operation wastes time, thereby causing the delay in the transcoding process.

Referring to FIG. 15 of the drawings, there is shown an example of the improvement of the above transcoder 50 as a second conventional transcoder 60. The second conventional transcoder 60 is adapted to perform the rate control without estimating the structure of GROUP OF PICTURES. As shown in FIG. 15, the second conventional transcoder 60 comprises a delay circuit 61 and a rate controller 62 in addition to the variable length decoder 51, the de-quantizer 53, the quantizer 55 and the variable length encoder 57 same as those of the first conventional transcoder 50 shown in FIG. 13. These same constitutional elements are simply represented by the same reference numerals as those of the conventional transcoder 50, and will be thus omitted from description for avoiding tedious repetition.

The delay circuit 61 is interposed between the variable length decoder 51 and the de-quantizer 53 and designed to control the flow of the signal from the variable length decoder 51 to the de-quantizer 53. The delay circuit 61 is operated to delay starting the de-quantizing process in the de-quantizer 53 until the variable length decoder 51 has been finished to decode one of the pictures in the coded moving picture sequence signal.

As shown in FIG. 15, the rate controller 62 of the second conventional transcoder 60 includes a target ratio computing unit 63, an input bit summing unit 65, a bit difference computing unit 67, a target output bit updating unit 69, and a quantization parameter computing unit 71.

The target ratio computing unit 63 is electrically connected to the variable length decoder 51 and designed to input an input bit rate of the first bit streams $b_1$, hereinlater referred to as "Input_Bitrate", from the variable length decoder 51, and input a target bit rate, hereinlater referred to as "Target_Bitrate" through a terminal $a_3$. Alternatively, the target bit rate Target_Bitrate may be previously stored in an internal memory, or determined on the basis of internal switches. The target ratio computing unit 63 is designed to then compute a target ratio (ioRatio) of the target bit rate Target_Bitrate to the input bit rate Input_Bitrate for each of pictures as follows.

$$ioRatio = \frac{Target\_Bitrate}{Input\_Bitrate} \qquad \text{equation (26)}$$

The input bit summing unit 65 is designed to sum the number of inputting bits of the picture decoded by the variable length decoder 51 to produce the total number of inputting bits $T_{in}$. On the other hand, the target output bit updating unit 69 is designed to compute a target number of outputting bits $T_{out}$ to be generated by the variable length encoder 57. The target number of outputting bits $T_{out}$ is computed by multiplying the total number of inputting bits $T_{in}$ by the target ratio ioRatio as follows:

$$T_{out} = T_{in} \times ioRatio \qquad \text{equation (27)}$$

The bit difference computing unit 67 is electrically connected to the variable length encoder 57 and the target output bit updating unit 69, and designed to input a real number of outputting bits $T_{real}$ encoded by the variable length encoder 57 and input the target number of outputting bits $T_{out}$. The bit difference computing unit 67 is designed to then compute a difference number of bits $T_{diff}$ between the target number of outputting bits $T_{out}$ and the real number of outputting bits $T_{real}$ as follows:

$$T_{diff} = T_{real} - T_{out} \qquad \text{equation (28)}$$

The target output bit updating unit 69 is electrically connected to the target ratio computing unit 63, the input bit summing unit 65, and the bit difference computing unit 67. The target output bit updating unit 69 is designed to update the target number of outputting bits To on the basis of the difference number of bits $T_{diff}$ as follows:

$$T_{out} = T_{out} - T_{diff} \qquad \text{equation (29)}$$

The quantization parameter computing unit 71 is electrically connected to the target output bit updating unit 69 and designed to compute the reference quantization parameter Q(j) for each of macroblocks MB(j) on the basis of the target outputting bits $T_{out}$ updated by the target output bit updating unit 69 in accordance with the step II of the TM-5.

FIG. 16 shows the flowchart of the rate controlling process performed by the above conventional transcoder 60. The rate controlling process in the transcoder 60 comprises the steps B1 to B13. The steps B6 to B13 are the almost same as those of the steps A7 to A14, respectively, in the rate controlling process shown in FIG. 14 except for the step B7 wherein the virtual buffer fullness is computed on the basis of the target number of outputting bits $T_{out}$ given by the target output bit updating unit 69 instead of the target number of bits $T_i$, $T_p$ or $T_b$ obtained in the step A3 shown in FIG. 14. These same steps will be thus omitted from description for avoiding tedious repetition.

In the step B1, "1" is assigned to the picture number variable n. The step B1 then goes to the step B2 wherein the target ratio ioRatio is computed by the above equation (26). In the following step B3, the difference number of bits $T_{diff}$ is computed for the present picture pic(n) by the above equation (28). The step B3 then goes to the step B4 wherein the number of inputting bits $T_{in}$ are summed up within the first bit streams $b_1$. In the step B5, the target number of outputting bits $T_{out}$ is computed by the above equation (27), and further updated by the above equation (29).

In the second conventional transcoder 60 thus constructed, the de-quantizer 53, however, must wait until the decoding process of the picture has been completed over the entire target transcoding flame, thereby causing the delay in the transcoding process.

Referring to FIGS. 17 and 18 of the drawings, there is shown another example of improvement of the above transcoder 50 as a third conventional transcoder 80. The third conventional transcoder 80 is also adaptable to perform the rate control without estimating the structure of GROUP OF PICTURES. As shown in FIG.17, the third conventional transcoder 80 comprises an input terminal $a_1$ electrically connected to a first transmitting path and designed to input an input bit streams $b_3$ at the input bit rate, and an output terminal as electrically connected to a second transmitting path and designed to output an output bit streams $b_4$ at the target bit rate. In the third conventional transcoder 80, the input bit streams $b_3$ have a format, non-adaptable for the MPEG-2, different from that of the bit streams $b_1$ of the first and second conventional transcoders 50 and 60. The input bit streams $b_3$ have information on the number of coding bits previously recorded thereon by the encoder, not shown.

The third conventional transcoder 80 comprises a variable length decoder 81 electrically connected to the input terminal $a_1$, and a rate controller 82 in addition to the de-quantizer 53, the quantizer 55, the variable length encoder 57 which are same as those of the second transcoder 60 shown in FIG. 13. The rate controller 82 includes a target output bit updating unit 83, and a quantization parameter computing unit 85 in addition to the target ratio computing unit 63, and the bit difference computing unit 67 which are same as those of the second transcoder 60 shown in FIG. 15.

The third conventional transcoder 80 thus constructed can perform the rate control on the basis of the formation on the number of coding bits previously recorded in the input bit streams $b_3$. The variable length decoder 81 is adapted to decode the pictures in the coded moving picture sequence signal within the third bit streams $b_3$ to obtain the information on the number of coding bits and transmit this information to the de-quantizer 53. The variable length decoder 81 is also adapted to transmit the number of inputting bits $T_{in}$ to the target output bit updating unit 83.

The outputting bit updating unit 83 is designed to compute the target number of outputting bits $T_{out}$ is computed on the basis of the number of inputting bits $T_{in}$ and the target ratio ioRatio by the above equation (26). The quantization parameter computing unit 85 is designed to compute the reference quantization parameter Q(j) for each of the macroblocks MB(j) on the basis of the target number of outputting bits $T_{out}$ updated by the outputting bit updating unit 83 according to the step II in the TM-5. The quantizer 55 is then operated to quantize the j-th macroblock MB(j) on the basis of the reference quantization parameter Q(j) given by the quantization parameter computing unit 85.

FIG. 18 shows the flowchart of the rate controlling process performed by the above third conventional transcoder 80. The rate controlling process in the transcoder 80 comprises the steps C1 to C13. All the steps C1 to C13 are the same as those of the steps B1 to B13, respectively, in the rate controlling process shown in FIG. 16 except for the step C4 wherein the information on the number of inputting bits $T_{in}$ in the current picture pic(n) is derived from the third bit streams $b_3$ by the decoder 81 to obtain the total number of inputting bits $T_{in}$.

The third conventional transcoder 80 thus constructed has information on the number of coding bits previously recorded in the third bits streams $b_3$ thereby making it possible to solve the problem of the delay in the second conventional transcoder 60. The third conventional transcoder 80, however, has another problem to restrict the form of the inputted bit streams. Moreover, the encoder which is linked with the third transcoder 80 must provide with the above information on the number of coding bits to be recorded in the bit streams, thereby causing the delay of process in the encoder.

In the any conventional transcoders 50, 60 and 80, the matrix of the de-quantization coefficients dequant is necessary for only the quantizer 55, but unnecessary for the transcoder itself to generate the desired bit streams. In order to eliminate the redundant matrix of the de-quantization coefficients dequant, there is proposed a fourth conventional transcoder 90 comprising a level converter 91 instead of the de-quantizer 53 and the quantizer 55 of the transcoder 50, as shown in FIG. 19. The level converter 91 is interposed between the variable length decoder 51 and the variable length encoder 57. The level converter 91 is designed to input the original picture data for each of pictures. The original picture data includes a matrix of original quantization coefficients level for each of macroblocks within the corresponding picture. The level converter 91 is electrically connected to the rate controller 59 and designed to input the second quantization parameter $Q_2$ from the rate controller 59.

The level converter 91 is further designed to convert the original picture data for each of pictures including the matrix of original quantization coefficients level into the objective picture data including the matrix of re-quantization coefficients tlevel without generating the matrix of the de-quantization coefficients dequant. The following equations (30) and (31) for the matrix of re-quantization coefficients tlevel are lead by eliminating the matrix of the de-quantization coefficients dequant from the above equations (1), (2), (3) and (4).

$$tlevel = \left\{(level + sign(level) \times \frac{1}{2}\right\} \times \frac{Q_1}{Q_2} \quad \text{or} \qquad \text{equation (30)}$$

$$tlevel = level \times \frac{Q_1}{Q_2} + \frac{sign(level)}{2} \qquad \text{equation (31)}$$

where the above equation (30) is used for the inter macroblock, while the above equation (31) is used for the intra macroblock. The level converter 91 is thus operable to convert the original picture data, for each of pictures, into the second pictures data with the first quantization parameter $Q_i$ and the second quantization parameter $Q_2$. The first quantization parameter $Q_i$ is decoded from the first bit streams $b_1$ by the variable length decoder 51, while the second quantization parameter $Q_2$ is obtained from the rate controller 59.

In the fourth conventional transcoder 90, the rate controller 59 is designed to perform the rate control over the encoding in the transcoder 90 according to the TM-5. The variable length encoder 57 is electrically connected to the level converter 91 and to input the above matrix of re-quantization coefficients tlevel from the level converter 91.

The fourth conventional transcoder 90 thus constructed can efficiently perform the transcoding process at high speed without storing the matrix of de-quantization coefficients dequant in a memory.

The above conventional transcoders 50, 60, 80 and 90, however, has another problem with the rate-distortion performance in converting the quantization level. The detailed description of this problem will be made later. In short, the rate-distortion performance in converting the quantization level is unstable and variable in accordance with the first and second quantization parameters and the level of the original quantization coefficients level. Therefore, as the reduced information volume becomes larger, the quantization error is liable to increase, thereby causing the unstable rate control in transcoding.

SUMMARY OF THE INVENTION

It is therefore an object of the present invention to provide a method of transcoding a coded moving picture sequence in which there is no need of information excluded from the coded moving picture sequence and no limitation in the form of the coded moving picture sequence prepared by the encoder in order to real timely and effectively reduce the bit rate of the coded moving picture sequence with low delay.

It is another object of the present invention to provide a method of transcoding a coded moving picture sequence in which it is possible to reduce the quantization error as well as to increase the reduced information volume. Therefore, the above method can achieve the appropriate rate control.

It is further object of the present invention to provide an apparatus for transcoding a coded moving picture sequence in which there is no need of information excluded from the coded moving picture sequence and no limitation in the form of the coded moving picture sequence prepared by the encoder in order to real timely and effectively reduce the bit rate of the coded moving picture sequence with low delay.

It is also object of the present invention to provide an apparatus for transcoding a coded moving picture sequence in which it is possible to reduce the quantization error as well as to increase the reduced information volume. Therefore, the above apparatus can achieve the appropriate rate control.

It is a yet object of the present invention to provide a computer program product for transcoding a coded moving picture sequence signal in which there is no need of information excluded from the coded moving picture sequence signal and no limitation in the form of the coded moving picture sequence signal prepared by the encoder in order to real timely and effectively reduce the bit rate of the coded moving picture sequence with low delay.

It is further yet object of the present invention to provide a computer program product for transcoding a coded moving picture sequence signal in which it is possible to reduce the quantization error as well as to increase the reduced information volume. Therefore, the above computer program product can achieve the appropriate rate control.

In accordance with a first aspect of the present invention, there is provided a method of transcoding a coded moving picture sequence, comprising the steps of:

(a) inputting a first coded moving picture sequence signal at an input bit rate, the first coded moving picture sequence signal consisting of a series of pictures;

(b) computing an estimated number of inputting bits to be input in the inputting step (a) for a predetermined duration on the basis of the input bit rate of the first coded moving picture sequence signal;

(c) decoding the first coded moving picture sequence signal inputted in the inputting step (a) to reconstruct an original picture data, for each of the pictures, having a number of real inputting bits;

(d) computing, for each of the pictures, a remaining number of inputting bits after the previous picture in the first coded moving picture sequence signal is decoded in the decoding step (c) on the basis of the number of real inputting bits of the previous picture and the estimated number of inputting bits obtained in the computing step (b);

(e) transforming, on the basis of a scaling factor, the original picture data reconstructed in the decoding step (c) for each of the pictures into an objective picture data having a number of real outputting bits less than the number of real inputting bits of the original picture data;

(f) encoding the objective picture data obtained in the transforming step (e) to generate a second coded moving picture sequence signal;

(g) outputting the second coded moving picture sequence signal generated in the encoding step (f) at a target bit rate lower than the input bit rate of the first coded moving picture sequence signal;

(h) computing an estimated number of outputting bits to be output in the outputting step (g) for the predetermined duration on the basis of the target bit rate of the second coded moving picture sequence signal;

(i) computing, for each of the pictures, a remaining number of outputting bits after the previous picture in the second coded moving picture sequence signal is encoded in the encoding step (f) on the basis of the number of real outputting bits of the previous picture and the estimated number of outputting bits obtained in the computing step (h);

(j) computing, for each of the pictures, a target ratio of the remaining number of outputting bits computed in the computing step (i) to the remaining number of inputting bits computed in the computing step (d) before the present picture is transformed in the transforming step (e); and (k) computing the scaling factor on the basis of the target ratio computed in the target ratio computing step (j) to control the target bit rate of the second coded moving picture sequence signal.

In the aforesaid method, the computing step (d) may comprise the steps of:

(d1) initializing the remaining number of inputting bits of the current picture on the basis of the estimated number of inputting bits;

(d2) updating the remaining number of inputting bits of the current picture on the basis of the number of real inputting bits of the previous picture and the remaining number of inputting bits of the previous picture;

(d3) repeating the step (d2) for each of the pictures; and (d4) repeating the steps (d1) and (d3) at time intervals of the predetermined duration. Furthermore, the computing step (h) may comprise the steps of:

(h1) initializing the remaining number of outputting bits of the current picture on the basis of the estimated number of outputting bits;

(h2) updating the remaining number of outputting bits of the current picture on the basis of the number of real outputting bits of the previous picture and the remaining number of outputting bits of the previous picture;

(h3) repeating the step (h2) for each of the pictures; and (h4) repeating the steps (h1) and (h3) at time intervals of the predetermined duration.

Alternatively, the aforesaid method may further comprise the step of repeating the steps (b), (d), (h) and (i) for each of the pictures.

Alternatively, in the aforesaid method, each of the pictures may consist of a plurality of blocks. Furthermore, the decoding step (c) may have the step of deriving an original scaling factor from the first coded moving picture sequence signal. The transforming step (e) may comprise the steps of:

(e1) dividing the original picture data for each of the picture into a plurality of block data respectively corresponding to the blocks;

(e2) quantizing the block data for each of the blocks with the scaling factor, and (e3) repeating the steps (e1) and (e2) for each of the blocks within the picture to generate the objective picture data. The step (k) may have the step of updating the scaling factor on the basis of the original scaling factor.

In accordance with a second aspect of the present invention, there is provided a method of transcoding a coded moving picture sequence, comprising the steps of:

(a) inputting a first coded moving picture sequence signal at an input bit rate, the first coded moving picture sequence signal consisting of a series of pictures;

(b) decoding the first coded moving picture sequence signal inputted in the inputting step (a) to reconstruct an original picture data, for each of the pictures, having a number of real inputting bits, and derive an original scaling factor;

(c) transforming, on the basis of a scaling factor, the original picture data reconstructed in the decoding step (b) for each of the pictures into an objective picture data having a number of real outputting bits less than the number of real inputting bits of the original picture data;

(d) encoding the objective picture data obtained in the transforming step (c) to generate a second coded moving picture sequence signal;

(e) outputting the second coded moving picture sequence signal generated in the encoding step (d) at a target bit rate lower than the input bit rate of the first coded moving picture sequence signal;

(f) computing a temporary scaling factor on the basis of the reconstructed original picture data to control the target bit rate of the second coded moving picture sequence signal; and (g) correcting the temporary scaling factor computed in the computing step (f) on the basis of the original scaling factor to derive the scaling factor for the transforming step (c).

In accordance with a third aspect of the present invention, there is provided an apparatus for transcoding a coded moving picture sequence, interposed between a first transmitting path and a second transmitting path, comprising: inputting means for inputting a first coded moving picture sequence signal through the first transmitting path at an input bit rate, the first coded moving picture sequence signal consisting of a series of pictures; decoding means for decoding the first coded moving picture sequence signal inputted through the inputting means to reconstruct an original picture data, for each of the pictures, having a number of real inputting bits; transforming means for transforming, on the basis of a scaling factor, the original picture data reconstructed by the decoding means for each of the pictures into an objective picture data having a number of real outputting bits less than the number of real inputting bits of the original picture data; encoding means for encoding the objective picture data obtained by the transforming means to generate a second coded moving picture sequence signal; outputting means for outputting the second coded moving picture sequence signal generated by the encoding means through the second transmitting path at a target bit rate lower than the input bit rate of the first coded moving picture sequence signal; and rate controlling means for controlling the target bit rate of the second coded moving picture sequence signal. The rate controlling means has: (a) a remaining bit computing unit for computing: an estimated number of inputting bits to be input through the inputting means for a predetermined duration on the basis of the input bit rate of the first coded moving picture sequence signal; a remaining number of inputting bits for each of the pictures in the first coded moving picture sequence signal on the basis of the number of real inputting bits of the current picture and the estimated number of inputting bits; an estimated number of outputting bits to be output through the outputting means for the predetermined duration on the basis of the target bit rate of the second coded moving picture sequence signal; and a remaining number of outputting bits for each of the pictures in the second coded moving picture sequence signal on the basis of the number of real outputting bits of the current picture and the estimated number of outputting bits; (b) a target ratio computing unit for computing, for each of the pictures, a target ratio of the remaining number of outputting bits computed by the remaining bit computing unit to the remaining number of inputting bits of the picture computed by the remaining bit computing unit; and (c) a scaling factor computing unit for computing the scaling factor on the basis of the target ratio computed by the target ratio computing unit to control the target bit rate of the second coded moving picture sequence signal.

The aforesaid apparatus may further comprise controlling means for operating the remaining bit computing unit to: update, for each of the pictures, the remaining number of inputting bits of the current picture on the basis of the number of real inputting bits of the previous picture and the remaining number of inputting bits of the previous picture; update, for each of the pictures, the remaining number of outputting bits of the current picture on the basis of the number of real outputting bits of the previous picture and the remaining number of outputting bits of the previous picture; initialize the remaining number of inputting bits of the current picture on the basis of the estimated number of inputting bits at time intervals of the predetermined duration; and initialize the remaining number of outputting bits of the current picture on the basis of the estimated number of outputting bits at time intervals of the predetermined duration.

Alternatively, the aforesaid apparatus may further comprise controlling means for operating the remaining bit computing unit to compute: for each of the pictures, the estimated number of inputting bits; the remaining number of inputting bits of the current picture; the estimated number of outputting bits; and the remaining number of outputting bits of the current picture.

Alternatively, in the aforesaid apparatus, each of the pictures may consist of a plurality of blocks. The decoding means may be further operated to derive an original scaling factor from the first coded moving picture sequence signal.

The transforming means may be further operated to transform the original picture data for each of the picture into a block data for each of the blocks. The controlling means may be operated to update the scaling factor on the basis of the original scaling factor.

In accordance with a fourth aspect of the present invention, there is provided an apparatus for transcoding a coded moving picture sequence signal. The apparatus is interposed between a first transmitting path and a second transmitting path and comprises: inputting means for inputting a first coded moving picture sequence signal through the first transmitting path at an input bit rate, the first coded moving picture sequence signal consisting of a series of pictures; decoding means for decoding the first coded moving picture sequence signal inputted through the inputting means to reconstruct an original picture data, for each of the pictures, having a number of real inputting bits, and derive an original scaling factor, transforming means for transforming, on the basis of a scaling factor, the original picture data reconstructed by the decoding means for each of the pictures into an objective picture data having a number of real outputting bits less than the number of real inputting bits of the original picture data; encoding means for encoding the objective picture data obtained by the transforming means to generate a second coded moving picture sequence signal; outputting means for outputting the second coded moving picture sequence signal generated by the encoding means through the second transmitting path at a target bit rate lower than the input bit rate of the first coded moving picture sequence signal; rate controlling means for controlling the target bit rate of the second coded moving picture sequence signal by computing a temporary scaling factor on the basis of the reconstructed original picture data; and correcting means for correcting the temporary scaling factor computed by the rate controlling means on the basis of the original scaling factor to derive the scaling factor for transforming means.

In accordance with a fifth aspect of the present invention, there is provided a computer program product comprising a computer usable storage medium having computer readable code embodied therein for transcoding a coded moving picture sequence signal. The computer readable code comprises: (a) computer readable program code for inputting a first coded moving picture sequence signal at an input bit rate, the first coded moving picture sequence signal consisting of a series of pictures; (b) computer readable program code for computing an estimated number of inputting bits to be input by the computer readable program code (a) for a predetermined duration on the basis of the input bit rate of the first coded moving picture sequence signal; (c) computer readable program code for decoding the first coded moving picture sequence signal inputted by the computer readable program code (a) to reconstruct an original picture data, for each of the pictures, having a number of real inputting bits; (d) computer readable program code for computing, for each of the pictures, a remaining number of inputting bits after the previous picture in the first coded moving picture sequence signal is decoded by the computer readable program code (c) on the basis of the number of real inputting bits of the previous picture and the estimated number of inputting bits obtained by the computer readable program code (b); (e) computer readable program code for transforming, on the basis of a scaling factor, the original picture data reconstructed by the computer readable program code (c) for each of the pictures into an objective picture data having a number of real outputting bits less than the number of real inputting bits of the original picture data; (f) computer readable program code for encoding the objective picture data obtained by the computer readable program code (e) to generate a second coded moving picture sequence signal; (g) computer readable program code for outputting the second coded moving picture sequence signal generated by the computer readable program code (f) at a target bit rate lower than the input bit rate of the first coded moving picture sequence signal; (b) computer readable program code for computing an estimated number of outputting bits to be output by the computer readable program code (g) for the predetermined duration on the basis of the target bit rate of the second coded moving picture sequence signal; (i) computer readable program code for computing, for each of the pictures, a remaining number of outputting bits after the previous picture in the second coded moving picture sequence signal is encoded by the computer readable program code (f) on the basis of the number of real outputting bits of the previous picture and the estimated number of outputting bits obtained by the computer readable program code (h); (j) computer readable program code for computing, for each of the pictures, a target ratio of the remaining number of outputting bits computed by the computer readable program code (i) to the remaining number of inputting bits computed by the computer readable program code (d) before the present picture is transformed by the computer readable program code (e); and (k) computer readable program code for computing the scaling factor on the basis of the target ratio computed by the computer readable program code (j) to control the target bit rate of the second coded moving picture sequence signal.

In the aforesaid computer program product, the computer readable program code (d) may have: (d1) computer readable program code for initializing the remaining number of inputting bits of the current picture on the basis of the estimated number of inputting bits; (d2) computer readable program code for updating the remaining number of inputting bits of the current picture on the basis of the number of real inputting bits of the previous picture and the remaining number of inputting bits of the previous picture; (d3) computer readable program code for repeating the computer readable program code (d2) for each of the pictures; and (d4) computer readable program code for repeating the computer readable program codes (d1) and (d3) at time intervals of the predetermined duration.

The computer readable program code (j) may further comprise: (h1) computer readable program code for initializing the remaining number of outputting bits of the current picture on the basis of the estimated number of outputting bits; (h2) computer readable program code for updating the remaining number of outputting bits of the current picture on the basis of the number of real outputting bits of the previous picture and the remaining number of outputting bits of the previous picture; (h3) computer readable program code for repeating the computer readable program code (h2) for each of the pictures; and. (h4) computer readable program code for repeating the computer readable program codes (h1) and (h3) at time intervals of the predetermined duration.

Alternatively, the aforesaid computer program product may further comprise computer readable program code for repeating the computer readable program codes (b), (d), (h) and (i) for each of the pictures.

Alternatively, in the aforesaid computer program product, each of the pictures may consist of a plurality of blocks. The computer readable program code (c) may further have computer readable program code for deriving an original scaling factor from the first coded moving picture sequence signal. The computer readable program code (e) may comprise: (e1) computer readable program code for dividing the original picture data for each of the picture into a plurality of block data respectively corresponding to the blocks; (e2) computer readable program code for quantizing the block data for each of the blocks with the scaling factor; and (e3) computer readable program code for repeating the computer readable program codes (e1) and (e2) for each of the blocks within the picture to generate the objective picture data. The computer readable program code (k) has further computer readable program code for updating the scaling factor on the basis of the original scaling factor.

In accordance with a sixth aspect of the present invention, there is provided a computer program product comprising a computer usable storage medium having computer readable code embodied therein for transcoding a coded moving picture sequence signal. The computer readable code comprises: (a) computer readable program code for inputting a first coded moving picture sequence signal at an input bit rate, the first coded moving picture sequence signal consisting of a series of pictures; (b) computer readable program code for decoding the first coded moving picture sequence signal inputted by the computer readable program code (a) to reconstruct an original picture data, for each of the pictures, having a number of real inputting bits, and derive an original scaling factor, (c) computer readable program code for transforming, on the basis of a scaling factor, the original picture data reconstructed by the computer readable program code (b) for each of the pictures into an objective picture data having a number of real outputting bits less than the number of real inputting bits of the original picture data; (d) computer readable program code for encoding the objective picture data obtained by the computer readable program code (c) to generate a second coded moving picture sequence signal; (e) computer readable program code for outputting the second coded moving picture sequence signal generated by the computer readable program code (d) at a target bit rate lower than the input bit rate of the first coded moving picture sequence signal; (f) computer readable program code for computing a temporary scaling factor on the basis of the reconstructed original picture data to control the target bit rate of the second coded moving picture sequence signal; and (g) computer readable program code for correcting the temporary scaling factor computed by the computer readable program code (f) on the basis of the original scaling factor to derive the scaling factor for the computer readable program code (c).

BRIEF DESCRIPTION OF THE DRAWINGS

The present invention and many of the advantages thereof will be better understood from the following detailed description when considered in connection with the accompanying drawings, wherein:

FIG. 11 is a graph showing the simulation results for characteristics of the relationship between the average quantization error and the reduced information volume for the intra macroblock in the transcoder shown in FIG. 10;

FIG. 12 is a graph showing the simulation results for characteristics of the relationship between the average quantization error and the reduced information volume for the inter macroblock in the transcoder shown in FIG. 10;

DESCRIPTION OF THE PREFERRED EMBODIMENTS

Figure 1:
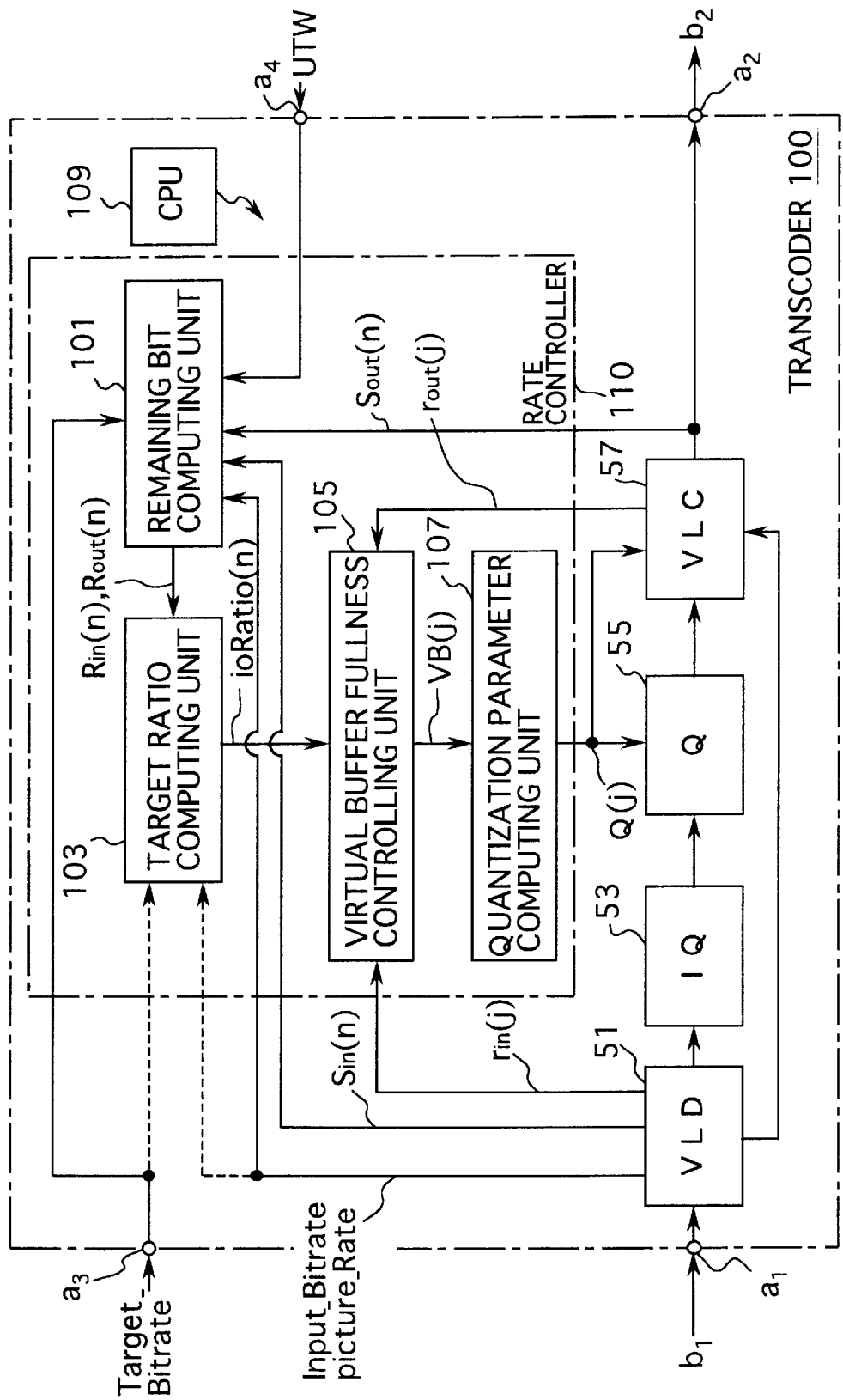
FIG. 1 is a block diagram of a first preferred embodiment of the apparatus for transcoding the coded moving picture sequence according to the present invention.

Referring now to FIG. 1 of the drawings, there is shown a first preferred embodiment of the apparatus for transcoding a coded moving picture sequence according to the present invention as a transcoder 100. The transcoder 100 of this embodiment is interposed between a first transmitting path, not shown, and a second transmitting path, not shown, and adapted to convert an original coded moving picture sequence signal in the form of first bit streams $b_1$ inputted from the first transmitting path at an input bit rate Input_Bitrate into another coded moving picture sequence signal in the form of second bit streams $b_2$ outputted to the second transmitting path at a target bit rate Target_Bitrate lower than the input bit rate Input_Bitrate of the first bit streams $b_1$. The coded moving picture sequence signal consists of a series of pictures. In this embodiment, the first bit streams $b_1$ inputted from the first transmitting path has, but is not limited to, a MPEG-2 format.

Figure 13:
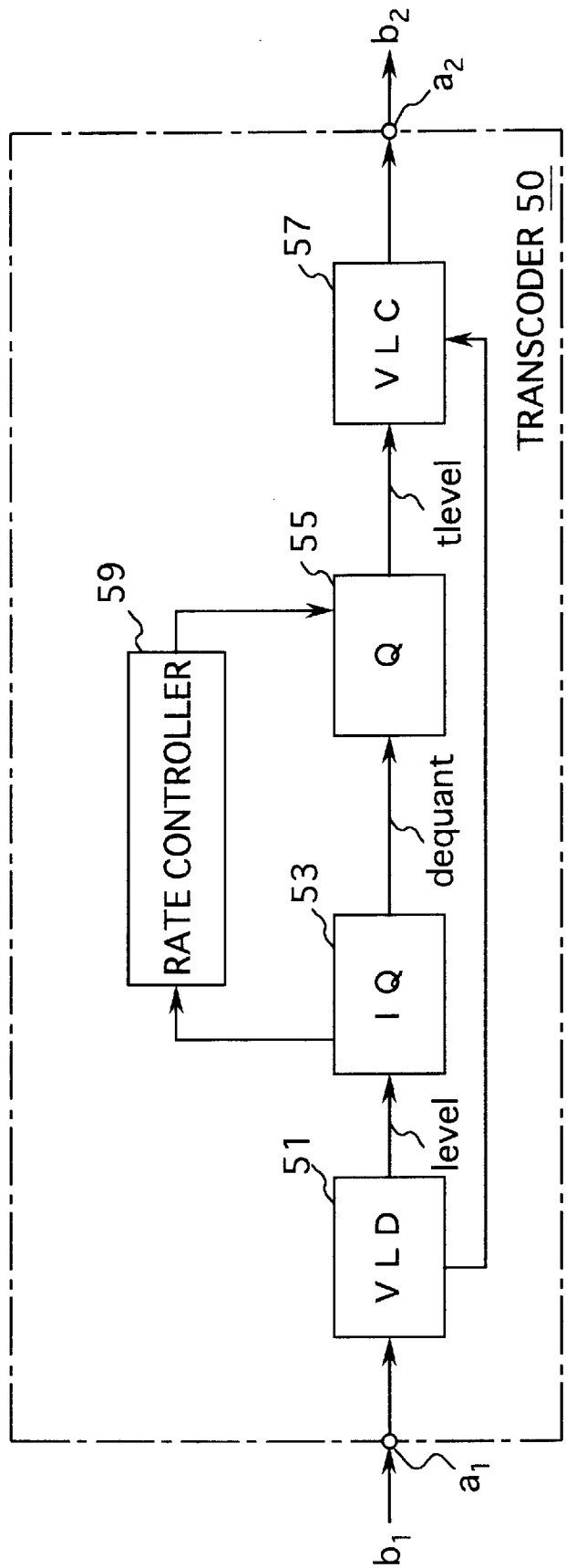
FIG. 13 is a schematic block diagram showing a first conventional transcoder.
Figure 14:
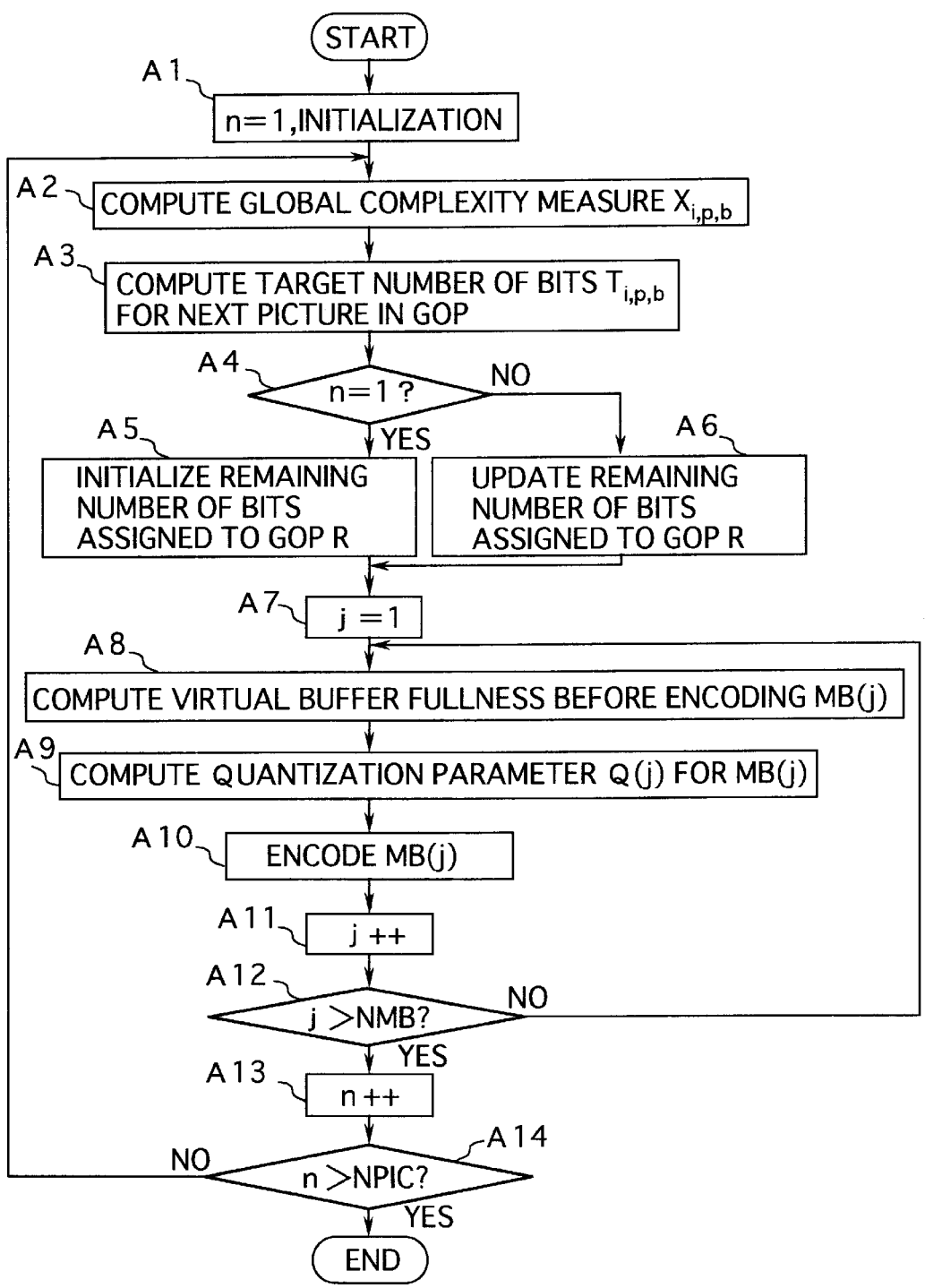
FIG. 14 is a flowchart showing the flow of the process of the rate control according to Test Model 5 of the MPEG-2 in the first conventional transcoder shown in FIG. 13.
Figure 15:
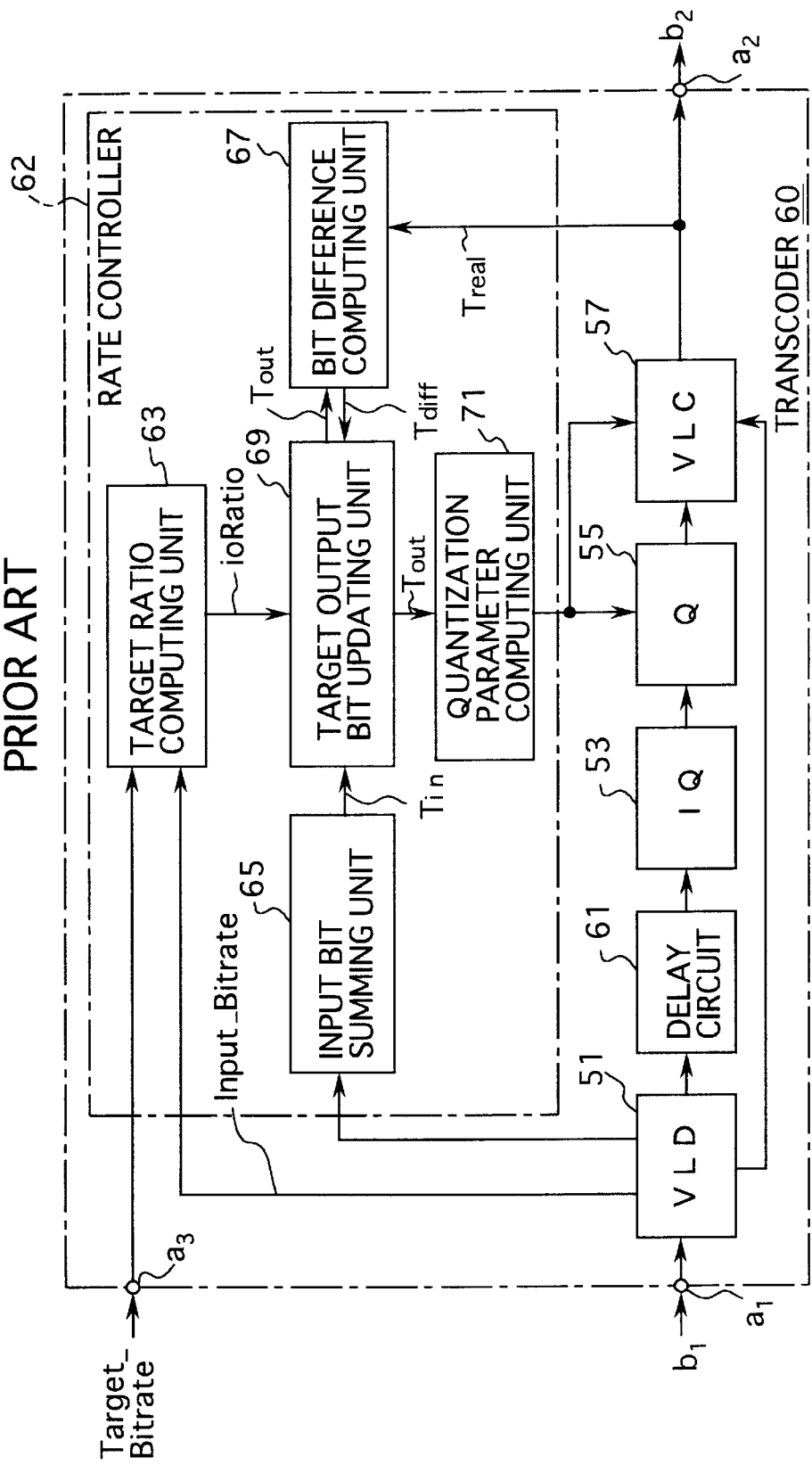
FIG. 15 is a schematic block diagram showing a second conventional transcoder.
Figure 16:
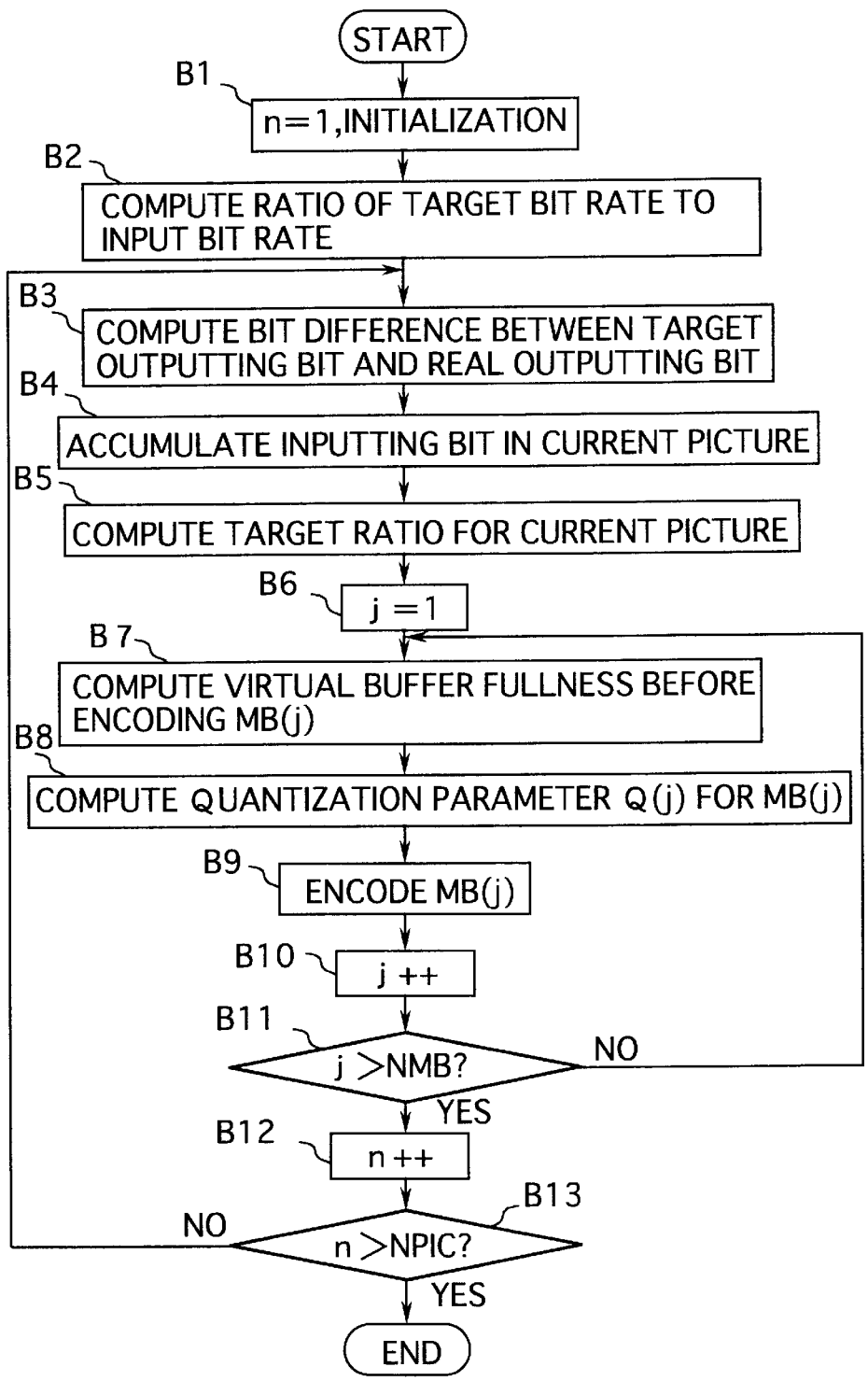
FIG. 16 is a flowchart showing the flow of the process of the second conventional transcoder shown in FIG. 15.
Figure 17:
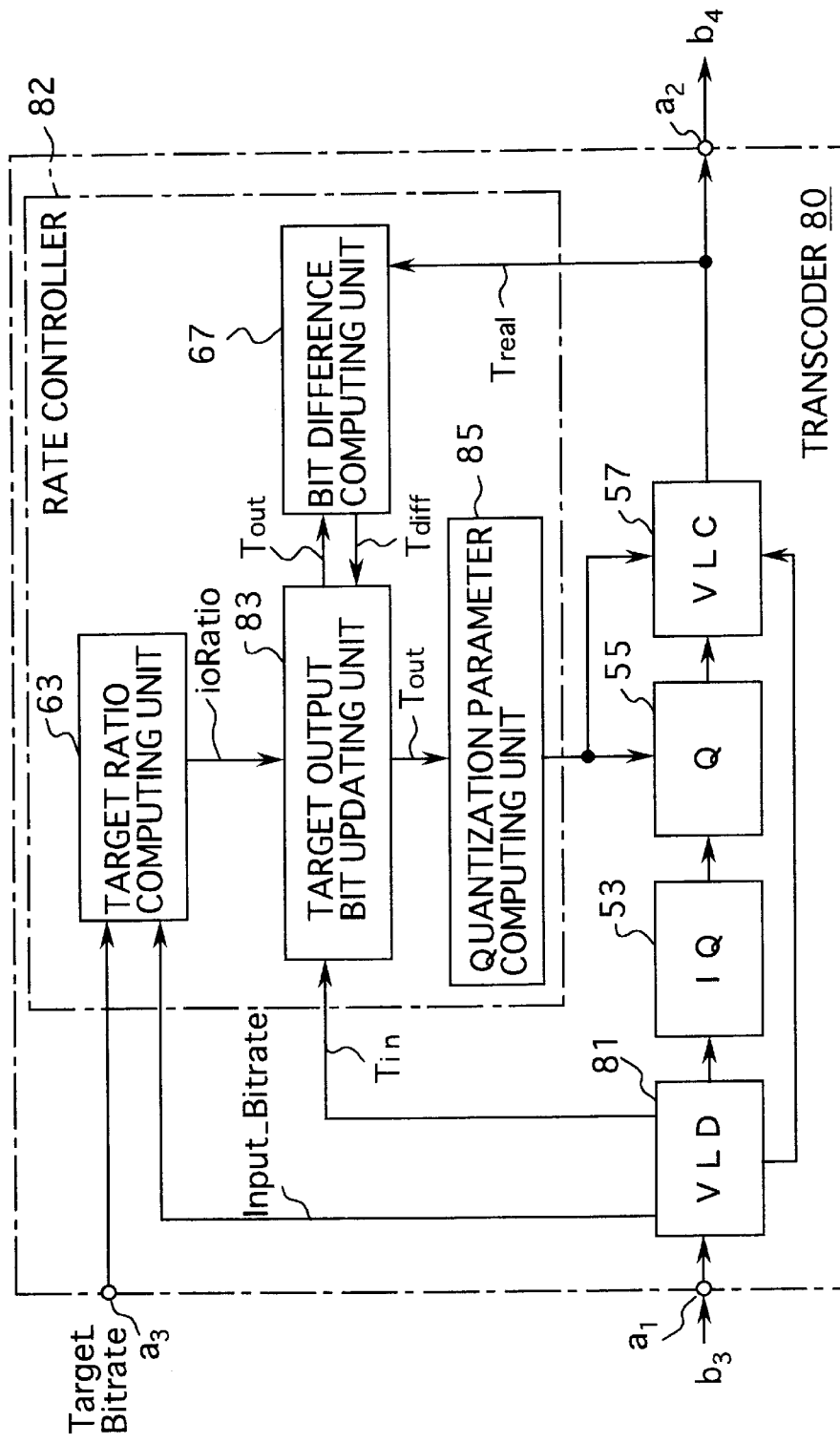
FIG. 17 is a schematic block diagram showing a third conventional transcoder.
Figure 18:
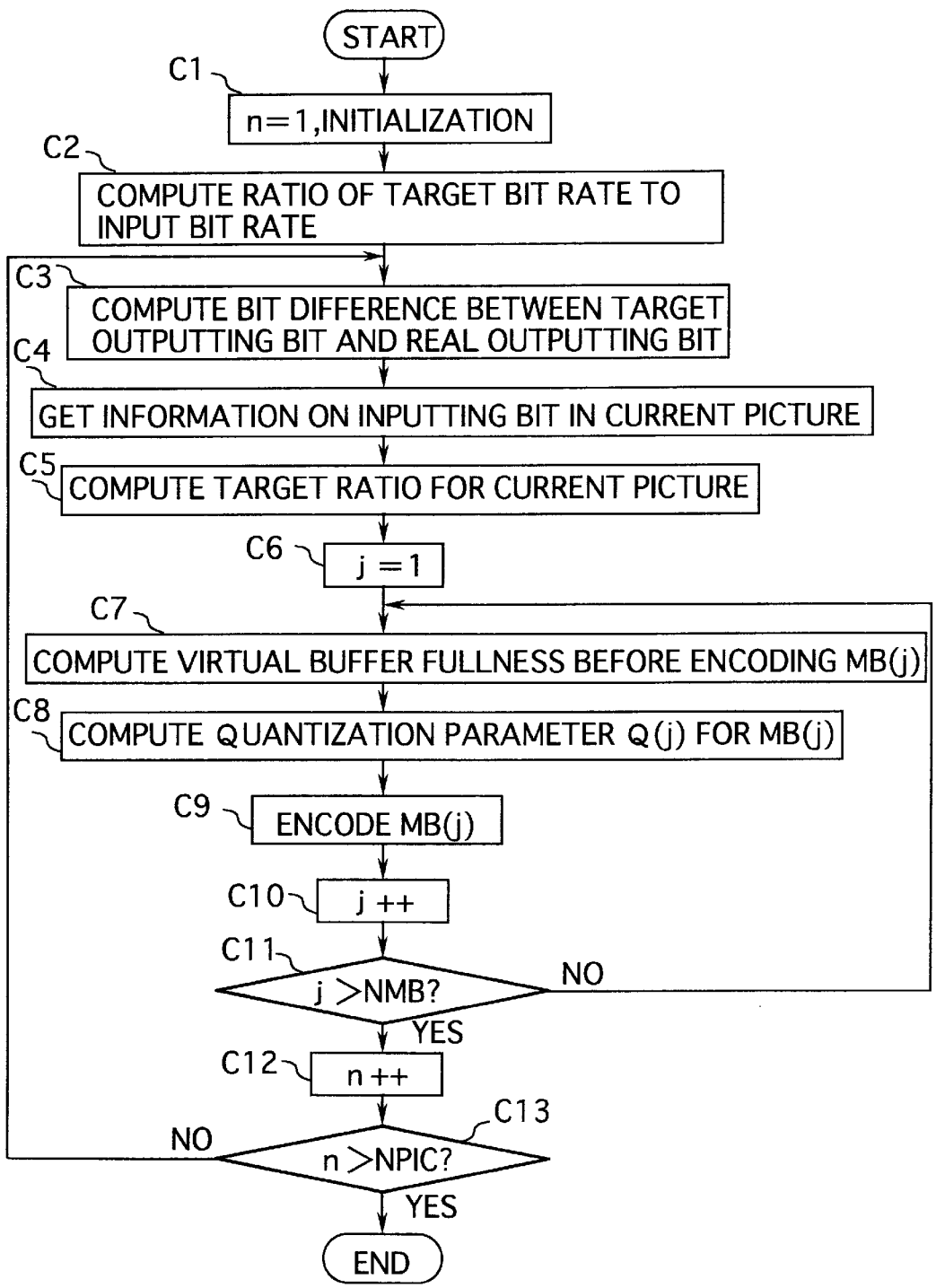
FIG. 18 is a flowchart showing the flow of the process of the third conventional transcoder shown in FIG. 17.

As shown in FIG. 1, the transcoder 100 comprises the variable length decoder 51, the de-quantizer 53, the quantizer 55, and the variable length encoder 57 which are the same as those of the conventional transcoder 50 shown in FIG. 13. These same constitutional elements are simply represented by the same reference numerals as those of the conventional transcoder 50, and will be thus omitted from description for avoiding tedious repetition.

The transcoder 100 has an input terminal $a_1$ electrically connected to the first transmitting path to input the first bit streams $b_1$ to the variable length decoder 51. The transcoder 100 has an output terminal $a_2$ electrically connected to the second transmitting path to output the second bit streams $b_2$ from the variable length encoder 57.

The transcoder 100 further comprises a rate controller 110 having a remaining bit computing unit 101, a target ratio computing unit 103, a virtual buffer fullness controlling unit 105, and a quantization parameter computing unit 107.

The rate controller 110 is electrically connected to the variable length decoder 51, the quantizer 55, and the variable length encoder 57, and designed to control the target bit rate of the outputted second bit streams $b_2$ by adapting the quantization parameter Q(j) of each of the macroblocks MB(j) on the basis of the information given by the variable length decoder 51 and the variable length encoder 57. The rate controller 110 is further electrically connected to the variable length encoder 57 and designed to output the quantization parameter Q(j) of each of the macroblocks MB(j) to the variable length encoder 57 wherein the quantization parameter Q(j) is encoded into the second bit streams $b_2$.

The remaining bit computing unit 101 is electrically connected to the variable length decoder 51 and the variable length encoder 57 and designed input a number of real inputting bits $S_{in}$ from the variable length decoder 51 and a number of real outputting bits $S_{out}$ from the variable length encoder 57. The number of real inputting bits $S_{in}$ is indicative of the number of bits decoded by the variable length decoder 51, while the number of real outputting bits $S_{out}$ encoded by the variable length encoder 57. In this embodiment of the transcoder 100, the number of real outputting bits $S_{out}$ is less than the number of real outputting bits $S_{out'}$.

The remaining bit computing unit 101 is designed to then compute a remaining number of inputting bits $R_{in}$ and a remaining number of outputting bits $R_{out}$. The remaining number of inputting bits $R_{in}$ is computed on the basis of an estimated number of inputting bits of the first bit streams $b_1$ to be input through the input terminal $a_1$ for a predetermined reference duration Ta and a number of real inputting bits $S_{in}$ decoded by the variable length decoder 51, while the remaining number of outputting bits $R_{out}$ is computed on the basis of an estimated number of outputting bits of the second bit streams $b_2$ to be output through the output terminal $a_2$ for the predetermined reference duration Ta and a number of real outputting bits $S_{out}$ encoded by the variable length encoder 57.

The above estimated number of inputting bits of the first bit streams $b_1$ means the initial value for the remaining number of inputting bits $R_{in}$ of the initial picture in the first bit streams $b_1$ within a time interval of the reference duration Ta, while the estimated number of outputting bits of the second bit streams $b_2$ means the initial value for the remaining number of outputting bits $R_{out}$ of the initial picture in the second bit streams $b_2$ within the time interval of the reference duration Ta. The detailed description of these initial values will be made later.

More specifically, the remaining bit computing unit 101 is designed to update, for each of pictures pic(n), the remaining number of inputting bits $R_{in}(n)$ of the current picture pic(n), and the remaining number of outputting bits $R_{out}(n)$ of the current picture pic(n). The remaining number of inputting bits $R_{in}(n-1)$ of the previous picture pic(n-1) is updated on the basis of the number of real inputting bits $S_{in}(n-1)$ of the previous picture pic(n-1) before the current picture pic(n) is encoded by the variable length encoder 57, while the remaining number of outputting bits $R_{out}(n-1)$ of the previous picture pic(n-1) is updated on the basis of the number of real outputting bits $S_{out}(n-1)$ of the previous picture pic(n-1) before the current picture pic(n) is encoded by the variable length encoder 57 as follows:

$$R_{in}(n) = R_{in}(n-1) - S_{in}(n-1) \qquad \text{equation (32)}$$

$$R_{out}(n) = R_{out}(n-1) - S_{out}(n-1) \qquad \text{equation (33)}$$

The initial value for the remaining number of inputting bits $R_{in}(1)$ of the first picture pic(1) within the first bit streams $b_1$ and the initial value for the remaining number of outputting bits $R_{out}(1)$ of the first picture pic(1) within the second bit streams $b_2$ are given by the following equations (34) and (35), respectively:

$$R_{in}(1) = \text{Input\_Bitrate} \times \frac{UTW}{\text{picture\_rate}} \qquad \text{equation (34)}$$

$$R_{out}(1) = \text{Target\_Bitrate} \times \frac{UTW}{\text{picture\_rate}} \qquad \text{equation (35)}$$

where Input_Bitrate is the input bit rate of the first bit streams $b_1$ and obtained from the first bit streams $b_1$ by the variable length decoder 51, picture_rate is a picture rate of the inputted first bit streams $b_1$ expressed in the number of frames per second and also obtained from the first bit streams $b_1$ by the variable length decoder 51, Target_Bitrate is the target bit rate of the second bit streams $b_2$ and inputted through an input terminal $a_3$, and UTW is the number of pictures processed for the reference duration Ta and inputted through an input terminal $a_4$. Here, (UTW/picture_rate) is equal to the above reference duration Ta.

For example, when it is assumed that picture_rate may be equal to thirty frames per second and UTW may be equal to fifteen, the reference duration Ta becomes 0.5 seconds. In another case when it is assumed that picture_rate may be equal to thirty frames per second and UTW may be equal to thirty, the reference duration Ta becomes one second. In this embodiment, UTW and Target_Bitrate are constant throughout an entire transcoding process, but if necessary, appropriately variable. In another embodiment, UTW and Target_Bitrate may be previously set by internal switches and may be variable in accordance with a predetermined command transmitted from an external device.

Furthermore, the remaining bit computing unit 101 is designed to initialize the remaining number of bits $R_{in}(n)$ and $R_{out}(n)$, before the initial picture within a time interval of the reference duration Ta is processed as follows:

$$R_{in}(n) = R_{in}(n-1) + \text{Input\_Bitrate} \times \frac{UTW}{\text{picture\_rate}} \qquad \text{equation (36)}$$

$$R_{out}(n) = R_{out}(n-1) + \text{Target\_Bitrate} \times \frac{UTW}{\text{picture\_rate}} \qquad \text{equation (37)}$$

The target ratio computing unit 103 is electrically connected to the remaining bit computing unit 101 and designed to input the remaining numbers of bits $R_{in}(n)$ and $R_{out}(n)$ of the current picture pic(n) from the remaining bit computing unit 101 to compute a target ratio ioRatio(n) for each of pictures pic(n). The target ratio ioRatio(n) is indicative of a ratio of the remaining number of outputting bits $R_{out}(n)$ to the remaining number of inputting bits $R_{in}(n)$ for each of the pictures pic(n) as follows:

$$ioRatio(n) = \frac{R_{out}(n)}{R_{in}(n)} \quad \text{equation (38)}$$

The virtual buffer fullness controlling unit 105 is electrically connected to the target ratio computing unit 103 and designed to input the target ratio ioRatio(n) for each of pictures pic(n) from the target ratio computing unit 103. The virtual buffer fullness controlling unit 105 is also electrically connected to the variable length decoder 51 and the variable length encoder 57. The virtual buffer fullness controlling unit 105 is designed to input the number of decoding bits $r_{in}(j-1)$ of the (j-1)th macroblock MB(j-1) within the corresponding picture generated by the variable length decoder 51 before the j-th macroblock MB(j) is encoded, and also input the number of encoding bits $r_{out}(j-1)$ of the (j-1)th macroblock MB(j-1) within the corresponding picture encoded by the variable length encoder 57 before the j-th macroblock MB(j) is encoded.

The virtual buffer fullness controlling unit 105 is further designed to calculate a virtual buffer fullness, referred to as $VB^i(j)$, $VB^p(j)$, or $VB^b(j)$, for I, P or B-picture before j-th macroblock MB(j) is encoded as follows:

$$VB^{ipb}(j) = VB^{ipb}(0) + \sum_{k=1}^{j-1} \{r_{out}(k) - r_{in}(k) \times ioRatio(n)\} \quad \text{equation (39)}$$

where the initial value of the virtual buffer fullness $VB^{ipb}(0)$ for each type picture is:

$$VB^i(0) = 10 \times r/31 \quad \text{equation (40)}$$

$$VB^p(0) = K_p \times VB^i(0) \quad \text{equation (41)}$$

$$VB^b(0) = K_b \times VB^i(0) \quad \text{equation (42)}$$

Here, $K_p$ and $K_b$ are universal constants dependent on the quantization matrices. When $K_p=1.0$ and $K_b=1.4$, the quality of the image can be always optimized.

The quantization parameter computing unit 107 is electrically connected to the virtual buffer fullness controlling unit 105 and designed to input the virtual buffer fullness $VB^{ipb}(j)$ of the j-th macroblock MB(j) from the virtual buffer fullness controlling unit 105 and to then compute the reference quantization parameter Q(j) used for the encoding the j-th macroblock MB(j) as follows:

$$Q(j) = \frac{VB^{ipb}(j) \times 31}{r} \quad \text{equation (43)}$$

where r is a reaction parameter defined by the following equation (44).

$$r = \frac{2 \times \text{Target\_Bitrate}}{\text{picture\_rate}} \quad \text{equation (44)}$$

In another embodiment, the virtual buffer fullness may be common to any type of pictures. In this case, the initial value of the virtual buffer fullness may be given by the above equation (40).

The transcoder 100 further comprises a central processing unit 109, hereinlater referred to as simply "CPU", for controlling the whole process in the transcoder 100. The process of the transcoder 100 controlled by the CPU 109 will be described with reference to FIGS. 2 and 3 of the drawings. The CPU 109 is operable to execute a predetermined program recorded in a computer usable storage medium, such as a ROM, having computer readable code embodied therein for transcoding a coded moving picture sequence according to the present invention.

Figure 2:
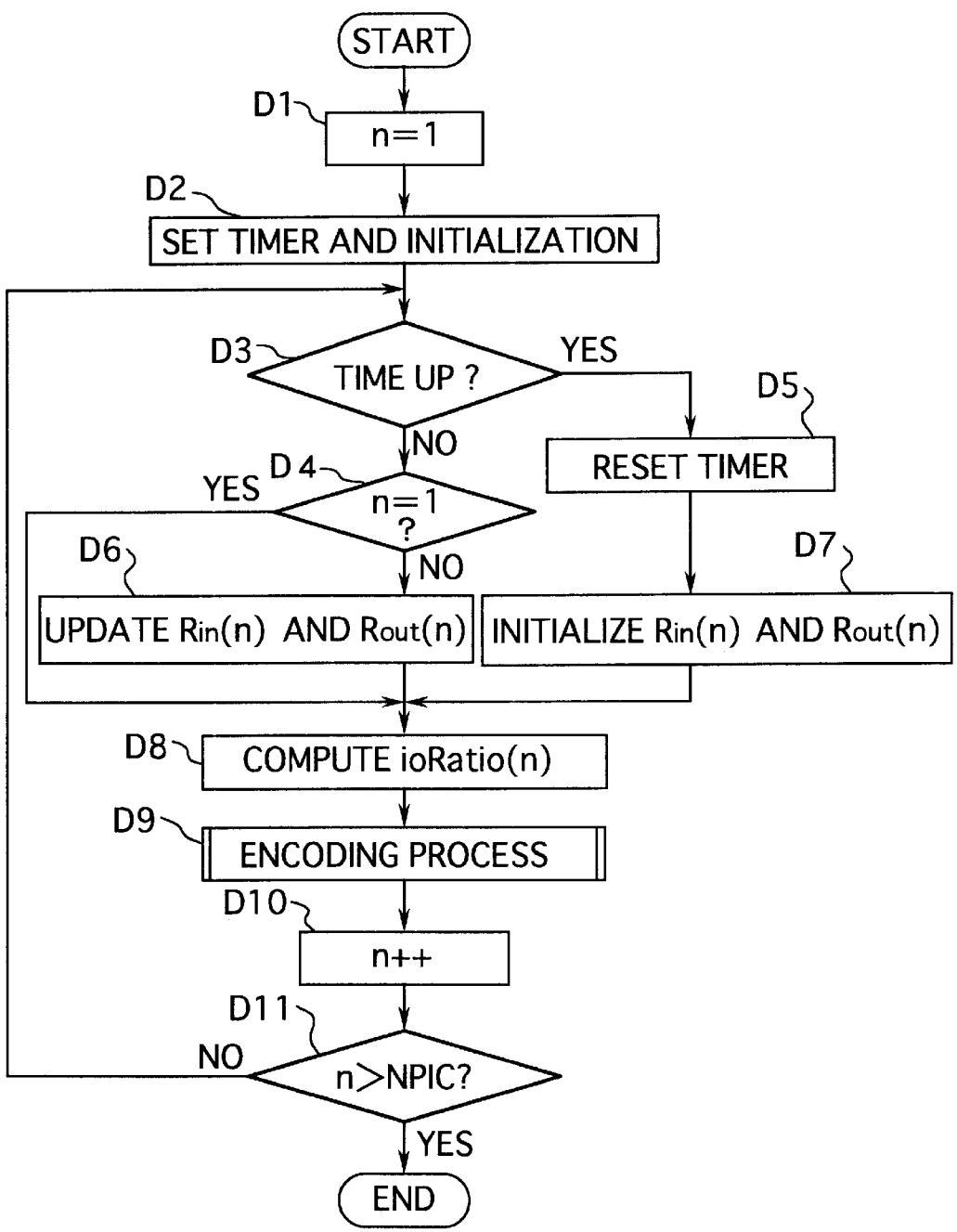
FIG. 2 is a flowchart showing the flow of a main routine executed by the central processing unit of the first embodiment of the apparatus as shown in FIG. 1 to employ the method of transcoding the coded moving picture sequence according to the present invention.

Referring now to FIG. 2 of the drawings, there is shown a flowchart of a main routine in the process controlled by the CPU 109 to employ the method of transcoding a coded moving picture sequence according to the present invention. As shown in FIG. 2, the main routine comprises the steps D1 to D11.

In the step D1, "1" is assigned to the picture number variable n representing a serial number of pictures within the first bit streams $b_1$. In the step D2, a timer for measuring the reference duration Ta is started, while the remaining bit computing unit 101 is operated to initialize the remaining number of inputting bits $R_{in}(1)$ and the remaining number of outputting bits $R_{out}(1)$ of the first picture pic(1) in accordance with the above equations (34) and (35), respectively. In this embodiment, the reference duration Ta is 1 or 0.5 seconds. As described above, the reference duration Ta is derived on the basis of UTW inputted through the input terminal $a_4$ and the picture_rate inputted from the variable length decoder 51.

In the following step D3, the judgment is made whether the reference duration Ta elapses or not. When the answer is "NO", i.e., the reference duration Ta has not been passed yet, the step D3 goes to the step D4. When the answer is "YES", the step D3 goes to the step D5 wherein the timer is reset and the step D5 further goes to the step D7. In another embodiment, the step D3 may be replaced with another monitoring procedure for monitoring a time-out of the above timer whereby the main routine may be interrupted with the time-out of the, above timer in order to go to the step D5.

In the step D4, the judgment is made whether the picture number variable n is 1 or not, i.e., the current picture pic(n) is the first picture pic(1) or not. When the judgment is made that the current picture pic(n) is not the first picture pic(1), the step D4 goes to the step D6. When the judgment is made that the current picture pic(n) is the first picture pic(1), the step D4 bypasses the step D6 to go to the step D8.

In the step D6, the remaining bit computing unit 101 is operated to update the remaining number of inputting bits $R_{in}(n)$ and the remaining number of outputting bits $R_{out}(n)$ of the n-th picture pic(n) in accordance with the above equations (32) and (33), respectively. On the other hand, in the step D7, the remaining bit computing unit 101 is operated to initialize the remaining number of inputting bits $R_{in}(n)$ and the remaining number of outputting bits $R_{out}(n)$ of the nth picture pic(n) in accordance with the above equations (36) and (37), respectively.

The step D6 or D7 goes to the step D8 wherein the target ratio computing unit 103 is operated to compute the target ratio ioRatio(n) of the n-th picture pic(n) in accordance with the above equation (38). In the following step D9, the encoding process is called. This encoding process will be described later. When the control is returned from the encoding process to the step D9, the step D9 goes to the step D10 wherein the picture number variable n is incremented by 1. In the following step D11, the judgment is made whether the picture number variable n is more than a predetermined total number of a series of pictures NPIC in or not. When the answer is "NO", the control is returned from the step D11 to the step D3. When the answer is "YES", the main routine is terminated. The picture number variable n thus serves as a loop counter for repeating the steps D3 to D10 to process all the pictures pic(n) in the current GROUP OF PICTURE. The entire pictures, the first picture pic(1) up to the NPIC-th picture pic(NPIC), in the current GROUP OF PICTURE can be thus processed in turn.

Figure 3:
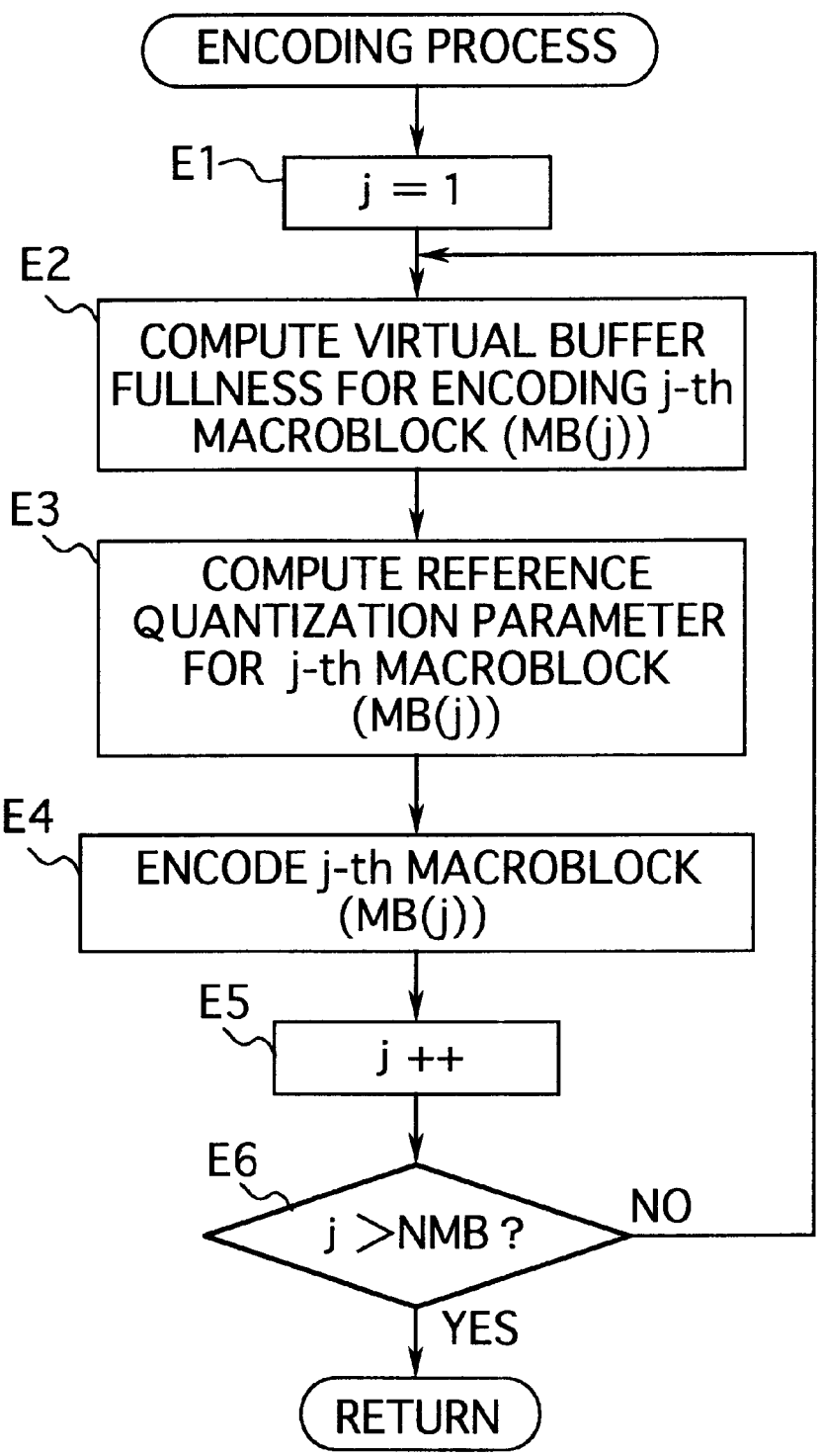
FIG. 3 is a flowchart showing the flow of an encoding process called by the main routine shown in FIG. 2.

Next, the encoding process called by the step D9 in the main routine shown in FIG. 2 will be described hereinlater with reference to FIG. 3 of the drawings. The encoding process comprises the steps E1 to E6.

In the step E1, "1" is assigned to a macroblock number variable j representing a serial number of macroblocks within one of the pictures. In the following step E2, the virtual buffer fullness controlling unit 105 is operated to compute the virtual buffer fullness VB(j) of the j-th macroblock MB(j) in accordance with the above equation (39) for the appropriate picture type. In the following step E3, the quantization parameter computing unit 107 is operated to compute the reference quantization parameter Q(j) for the j-th macroblock MB(j) in accordance with the above equation (43).

In the step E4, the quantizer 55 is operated to quantize the j-th macroblock MB(j) with the reference quantization parameter Q(j) given in the above step E3. In the following step E5, the macroblock number variable j is increment by 1. In the following step E6, the judgment is made whether the macroblock number variable j is more than a total number of macroblocks NMB within the n-th picture pic(n). When the answer is "NO", the control is returned from the step E6 to the step E2. When the answer is "YES", the encoding process is terminated and the control is returned to the main routine. The macroblock number variable j thus serves as a loop counter for repeating the steps E2 to E5 to encode all the macroblocks MB(j) in the present picture pic(n). The entire macroblocks, the first macroblock MB(1) up to the NMB-th macroblock MB(NMB), in the n-th picture pic(n) can be thus encoded in turn.

In this embodiment, the target ratio ioRatio is updated whenever each of the picture is encoded. In another embodiment, the target ratio ioRatio may be constantly determined on the basis of the input bit rate Input_Bitrate and the target bit rate Target_Bitrate. In this case, the target ratio computing unit 103 is directly electrically connected to the variable length decoder 51 to input the input bit rate Input_Bitrate as well as the target bit rate Target_Bitrate.

The operation of the transcoder 100 of the first embodiment will be described hereinlater in detail.

As shown in FIG. 2, "1" is assigned to the picture number variable n in the step D1 of the main routine. In the following step D2, the timer is set to the reference duration Ta and started to measure the reference duration Ta. Moreover, the remaining number of inputting bits $R_{in}(1)$ and the remaining number of outputting bits $R_{out}(1)$ are initialized in accordance with the above equations (34) and (35), respectively, by the remaining bit computing unit 101. The step D2 goes to the step D3 wherein the judgment is then made whether the reference duration Ta elapses or not. At this time, the reference duration Ta has not been passed yet, so that the step D3 goes to the step D4. In the step D4, the judgment is made whether the picture number variable n is 1 or not, i.e., the current picture is the first picture pic(1) or not. At this time, the current picture is the first picture pic(1). Consequently, the step D4 goes to the step D8 wherein the target ratio ioRatio(1) of the first picture pic(1) is computed by the target ratio computing unit 103 in accordance with the above equation (38). The encoding process shown in FIG. 3 is then called in the next step D9. In the encoding process, all of the macroblocks within the first picture pic(1) are encoded. After the control is returned from the encoding process to the step D10, the picture number variable n is incremented by "1" into "2". In the following step D11, the judgment is made whether the picture number variable n is more than the total number of pictures NPIC or not. At this time, the picture number variable n is two, i.e., less than the total number of picture NPIC. Consequently, the control is returned from the step D11 to the step D3.

In the step D3, the judgment is then made whether the reference duration Ta elapses or not. At this time, the reference duration Ta has not been passed yet, so that the step D3 goes to the step D4 wherein the judgment is made whether the picture number variable n is 1 or not. At this time, the picture number variable n is 2, so that the step D4 goes to the step D6 wherein the remaining number of inputting bits $R_{in}(2)$ and the remaining number of outputting bits $R_{out}(2)$ are updated in accordance with the above equations (32) and (33) by the remaining bit computing unit 101. In the following step D8, the target ratio ioRatio(2) for the second picture pic(2) is computed by the target ratio computing unit 103 in accordance with the above equation (38). The encoding process shown in FIG. 3 is then called in the next step D9. In the encoding process, all of the macroblocks within the second picture pic(2) are encoded. After the control is returned from the encoding process to the step D10, the picture number variable n is incremented by "1" into "3". In the following step D11, the judgment is made whether the picture number variable n is more than the total number of pictures NPIC or not. At this time, the picture number variable n is three, i.e., less than the total number of picture NPIC. Consequently, the control is returned from the step D11 to the step D3.

Until the reference duration Th elapses, the above process is repeated for each of the pictures in turn. When the reference duration Ta, for example, 1 second, elapses, the thirtieth picture pic(30) has been encoded. Before the 31$^{st}$ picture pic(31) is encoded in the step D9, the judgment is made in the step D3 that the reference duration Ta elapses. Then the step D3 goes to the step D5 wherein the timer is reset to newly start counting the reference duration Ta. In the following step D7, the remaining number of inputting bits $R_{in}(31)$ and the remaining number of outputting bits $R_{out}(31)$ are initialized in accordance with the above equations (36) and (37) by the remaining bit computing unit 101. The step D7 then goes to the step D8 thereafter the aforesaid process will be repeated.

Then, the CPU 109 of the transcoder 100 is operated to repeat the steps D3 to D11 until the picture number variable n exceeds to the total number of picture NPIC. The judgment is made in the step D11 that the picture number variable n exceeds to the total number of picture NPIC, the main routine shown in FIG. 2 is terminated. Thus, all the pictures within one of the GROUP OF PICTURES are encoded.

The first embodiment of the transcoder 100 thus constructed can achieve the efficient rate control wherein there is no need of information excluded from the coded moving picture sequence signal and no limitation in the form of the coded moving picture sequence signal prepared by the encoder in order to real timely and effectively reduce the bit rate of the coded moving picture sequence with low delay.

Figure 4:
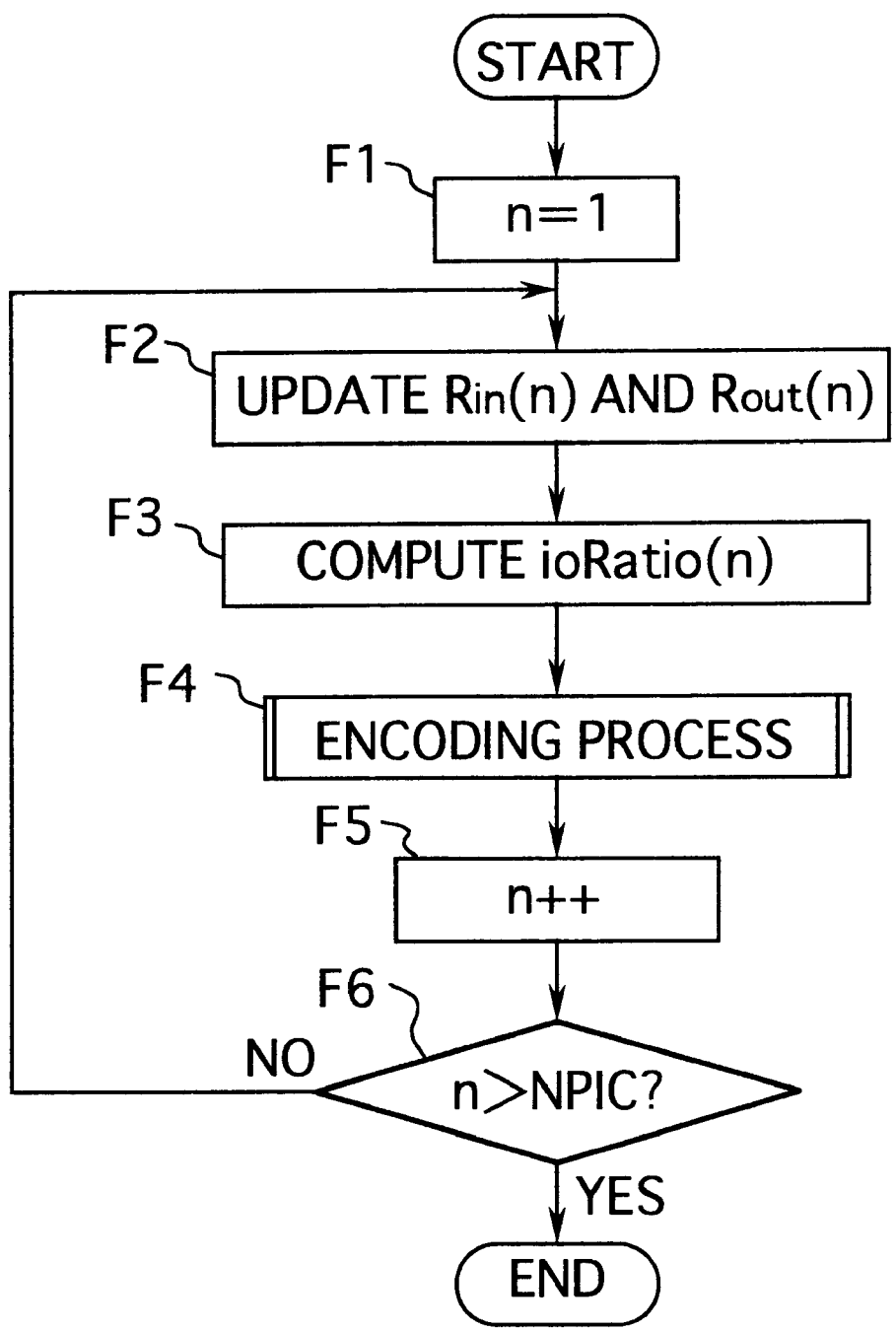
FIG. 4 is a flowchart showing, as a second preferred embodiment, the flow of another example of a main routine executed by the central processing unit of the transcoder as shown in FIG. 1 to employ the method of transcoding the coded moving picture sequence according to the present invention.

Referring now to FIG. 4 of the drawings, there is shown the flowchart of another main routine in the process controlled by the CPU 109 as a second preferred embodiment of the method of transcoding a coded moving picture sequence according to the present invention. As shown in FIG. 4, the main routine comprises the steps F1 to F6 in the second embodiment.

In the step F1, "1" is assigned to a picture number variable n indicative of a serial number of the pictures pic(n) within the inputted first bit streams $b_1$. In the step F2, the remaining bit computing unit 101 is operated to update the remaining number of inputting bits $R_{in}(n)$ and the remaining number of outputting bits $R_{out}(n)$ of the n-th picture pic(n) within the reference duration Ta in accordance with the above equations (32) and (33), respectively. Here, when the picture number variable n equals to 1, the remaining number of inputting bits $R_{in}(1)$ and the remaining number of outputting bits $R_{out}(1)$ of the first picture pic(1) is only initialized in accordance with the above equations (34) and (35).

In this embodiment, the remaining number of inputting bits $R_{in}(n)$ and the remaining number of outputting bits $R_{out}(n)$ of the nth picture pic(n) correspond to the remaining number of bits of the pictures in the whole range of the number of pictures UTW.

In another embodiment, the number of real inputting bits $S_{in}(n)$ of the current picture pic(n) and the number of real outputting bits $S_{out}(n)$ of the current picture pic(n) may be updated by summing up a first predetermined number of pictures encoded prior to the n-th picture pic(n), i.e., previously encoded a predetermined time ago, to obtain a total number of real inputting bits $S_{in}(n)$ of the current picture pic(n) and a total number of real outputting bits $S_{out}(n)$ of the current picture pic(n) for each of pictures.

In further another embodiment, the remaining number of inputting bits $R_{in}(n)$ of the current picture pic(n) and the remaining number of outputting bits $R_{out}(n)$ of the current picture pic(n) may be updated by summing up a second predetermined number of pictures encoded prior to the n-th picture pic(n), i.e., previously encoded another predetermined time ago.

In the following step F3, the target ratio computing unit 103 is operated to compute the target ratio ioRatio(n) of the current picture pic(n) in accordance with the above equation (38). In the following step F4, the aforesaid encoding process shown in FIG. 3 is called. When the control is returned from the encoding process to the step F4, the step F4 goes to the step F5 wherein the picture number variable n is incremented by 1. In the following step F6, the judgment is made whether the picture number variable n is more than a predetermined total number of a series of pictures NPIC in or not. When the answer is "NO", the control is returned from the step F6 to the step F2. When the answer is "YES", the main routine is terminated. The steps F2 to F5 in the main routine can be thus repeated for the whole pictures to be transformed by the transcoder 100.

The operation of the transcoder 100 of the second embodiment will be described hereinlater in detail.

As shown in FIG. 4, "1" is assigned to the picture number variable n in the step F1 of the main routine. In the following step F2, the remaining number of inputting bits $R_{in}(1)$ and the remaining number of outputting bits $R_{out}(1)$ of the first picture pic(1) are initialized in accordance with the above equations (34) and (35), respectively, by the remaining bit computing unit 101. The step F2 goes to the step F3 wherein the target ratio ioRatio(1) of the first picture pic(1) is computed in accordance with the above equation (38) by the target ratio computing unit 103. The step F3 goes to the step F4 wherein the encoding process shown in FIG. 3 is called. In the encoding process, all of the macroblocks within the first picture pic(1) are encoded. After the control is returned from the encoding process to the step F5, the picture number variable n is incremented by "1" into "2". In the following step F6, the judgment is made whether the picture number variable n is more than the total number of pictures NPIC or not. At this time, the picture number variable n is two, i.e., less than the total number of picture NPIC. Consequently, the control is returned from the step F6 to the step F2.

In the step F2, the remaining number of inputting bits $R_{in}(2)$ and the remaining number of outputting bits $R_{out}(2)$ of the second picture pic(2) are computed in accordance with the above equations (32) and (33), respectively, by the remaining bit computing unit 101. The step F2 goes to the step F3 wherein the target ratio ioRatio(2) of the second picture pic(2) is computed in accordance with the above equation (38) by the target ratio computing unit 103. The step F3 goes to the step F4 wherein the encoding process shown in FIG. 3 is called. In the encoding process, all of the macroblocks within the second picture pic(2) are encoded. After the control is returned from the encoding process to the step F5, the picture number variable n is incremented by "1" into "3". In the following step F6, the judgment is made whether the picture number variable n is more than the total number of pictures NPIC or not. At this time,-the picture number variable n is three, i.e., less than the total number of picture NPIC. Consequently, the control is returned from the step F6 to the step F2.

Then, the CPU 109 of the transcoder 100 is operated to repeat the steps F2 to F5 until the picture number variable n exceeds to the total number of picture NPIC. The judgment is made in the step F6 that the picture number variable n exceeds to the total number of picture NPIC, the main routine shown in FIG. 4 is terminated. Thus, the pictures within one of the GROUP OF PICTURES are encoded.

The above transcoder 100 thus constructed in the second embodiment can also achieve the efficient rate control wherein there is no need of information excluded from the coded moving picture sequence signal and no limitation in the form of the coded moving picture sequence signal prepared by the encoder in order to real timely and effectively reduce the bit rate of the coded moving picture sequence with low delay.

As described above, the apparatus, method and computer program product for transcoding the coded moving picture sequence according to the present invention can be operated to compute the target ratio ioRatio on the basis of the remaining number of bits $R_{in}$ and $R_{out}$ for a predetermined reference duration and to control the virtual buffer of each of macroblocks on the basis of the target ratio ioRatio. This operation is equivalent to that of the aforesaid rate control of TM-5 in both of steps I and II. Furthermore, there is no need to estimate the structure of pictures. Even if there is a great variation in the number of inputting bits of the coded moving picture sequence signal due to the change of scene, the appropriate rate control can be achieved.

Experimental Simulation Result

The delay in transcoding was measured in the transcoder 100 of the first embodiment under the following condition:

Input MPEG-2 bit streams: ITU-R Rec. 601 signal having 4:2:0 format; and

Sequence Bus: a size of 704 pixels×480 lines, and a bit rate of 15 Mbps.

The process shown in FIG. 2 was performed by the transcoder 100 of the first embodiment. The experimental simulation was conducted to determine the delay of the time measured from the input of the bit streams to the start of transcoding. As the experimental simulation result, the average of the delay measured 0.0253 msec in the transcoder 100 according to the present invention. This means that the transcoder 100 according to the present invention can remarkably reduce the delay in transcoding by 99.924% with respect to the delay of 33.36 msec in the conventional transcoder.

Figure 5:
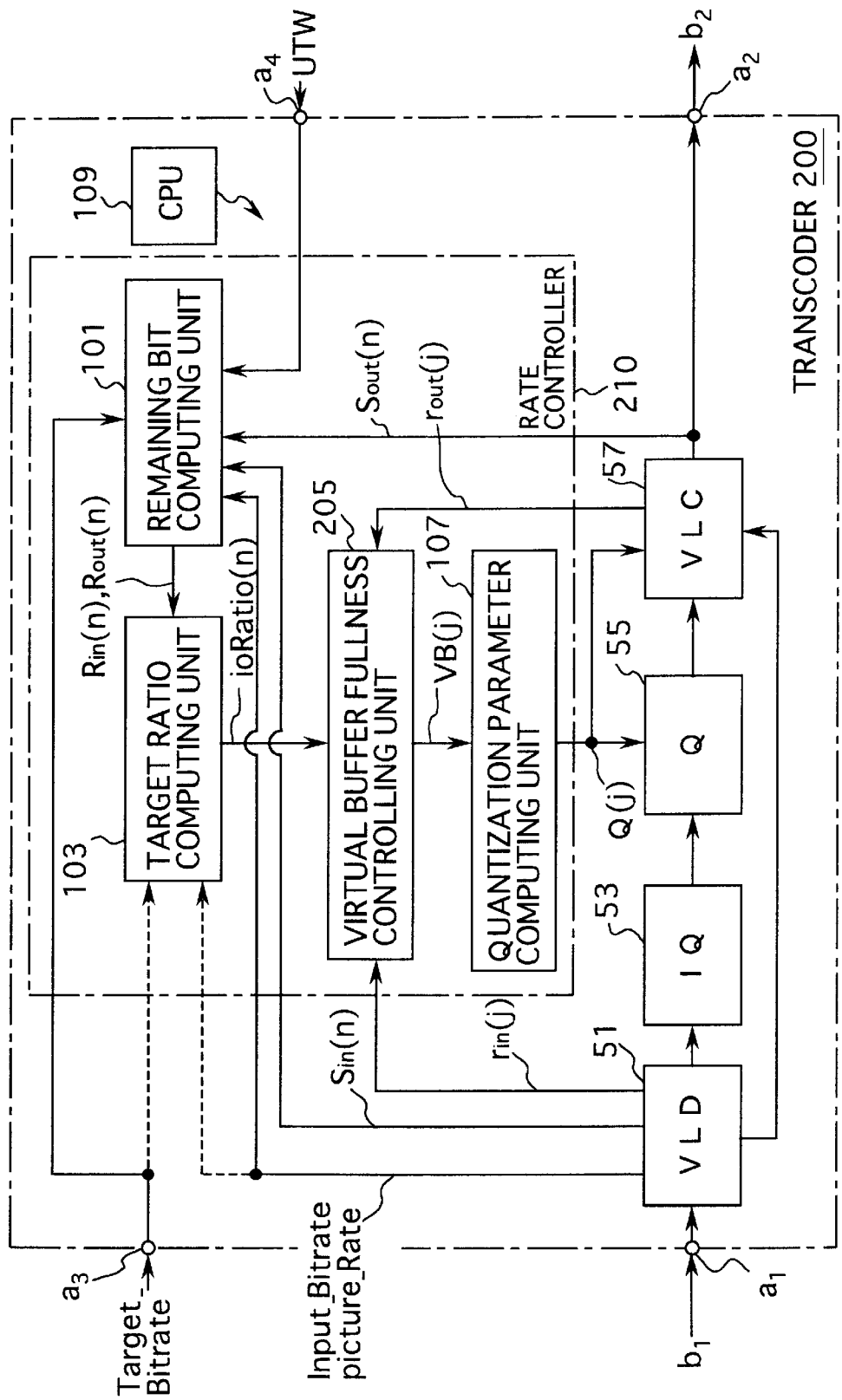
FIG. 5 is a block diagram of a third preferred embodiment of the apparatus for transcoding the coded moving picture sequence according to the present invention.

Referring now to FIG. 5 of the drawings, there is shown a third preferred embodiment of the apparatus for transcoding the coded moving picture sequence according to the present invention as a transcoder 200. The third embodiment of the transcoder 200 comprises a rate controller 210 instead of the rate controller 110 of the first embodiment of the transcoder 100 shown in FIG. 1. The rate controller 210 of the transcoder 200 comprises a virtual buffer fullness controlling unit 205 and the same constitutional elements as those of the first embodiment of the transcoder 100 shown in FIG. 1 except for the virtual buffer fullness controlling unit 105. These same constitutional elements are simply represented by the same reference numerals as those of the first embodiment of the transcoder 100 shown in FIG. 1, and will be thus omitted from description for avoiding tedious repetition.

The virtual buffer fullness controlling unit 205 is electrically connected to the target ratio computing unit 103, and designed to input the target ration ioRatio(n) from the target ratio computing unit 103. The virtual buffer fullness controlling unit 205 is also electrically connected to the variable length decoder 51 and the variable length encoder 57. The virtual buffer fullness controlling unit 205 is designed to input the number of decoding bits $r_{in}(j-1)$ of the (j–1)th macroblock MB(j–1) within the corresponding picture generated by the variable length decoder 51 before the j-th macroblock MB(j) is encoded, and also input the number of encoding bits $r_{out}(j-1)$ of the (j–1)th macroblock MB(j–1) within the corresponding picture encoded by the variable length encoder 57 before the j-th macroblock MB(j) is encoded.

The virtual buffer fullness controlling unit 205 is further designed to calculate a virtual buffer fullness, referred to as $VB^i(j)$, $VB^p(j)$, or $VB^b(j)$, for I, P or B-picture before j-th macroblock MB(j) is encoded as follows:

$$VB^{ipb}(j) = VB^{ipb}(0) + r_d \sum_{k=1}^{j-1} \{r_{out}(k) - r_{in}(k) \times ioRatio(n)\} \quad \text{equation (45)}$$

where $r_d$ ($r_d>0$) is a delay controlling parameter for controlling the delay factor in the transcoding process, thereby making it possible to adjust the level in the feedback process. For example, the delay quantity in the transcoding can be reduced, as the delay controlling parameter $r_d$ becomes larger. As a result, the speed of the transcoding process can be increased.

The delay quantity in the transcoding is monotonically reduced as the delay controlling parameter $r_d$ becomes larger. For instance, the delay quantity in the transcoding may be reduced by 90% from 20 msec to 2 msec within a range of the delay controlling parameter $r_d$: $1.0 = <r_d = <10$.

The larger delay controlling parameter $r_d$ however causes the S/N (Signal to Noise) ratio indicative of the quality of the image to deteriorate. According to the experiment, the maximum of the S/N ratio was caused by the delay controlling parameter $r_d$ within the range: $0<r_d = <1.0$. The S/N ratio came to fall within the range approximately from 0.3 dB to 0.5 dB, as the delay controlling parameter $r_d$ was varied from 1 to 10. This results in the fact that the delay controlling parameter $r_d$ may be preferably determined at every opportunity in accordance with the condition to achieve the desired delay in transcoding as well as the desired S/N ratio.

The virtual buffer fullness $VB^{ipb}(j)$ calculated by the virtual buffer fullness controlling unit 205 is then outputted to the quantization parameter computing unit 107. The transcoder 200 of the third embodiment is then operated according to the same process as the first or second embodiment shown in FIG. 2 or 4 and FIG. 3 except for the step E3 in the encoding process shown in FIG.3. In this embodiment, the virtual buffer fullness $VB^{ipb}(j)$ is calculated by the virtual buffer fullness controlling unit 205 in accordance with the above equation (45) in the step E2.

The third embodiment of the apparatus and method for transcoding the coded moving picture sequence according to the present invention has an advantage over the prior art in achieving the control of the delay in transcoding as well as the same function and effect as those of the first and second embodiments.

Figure 6:
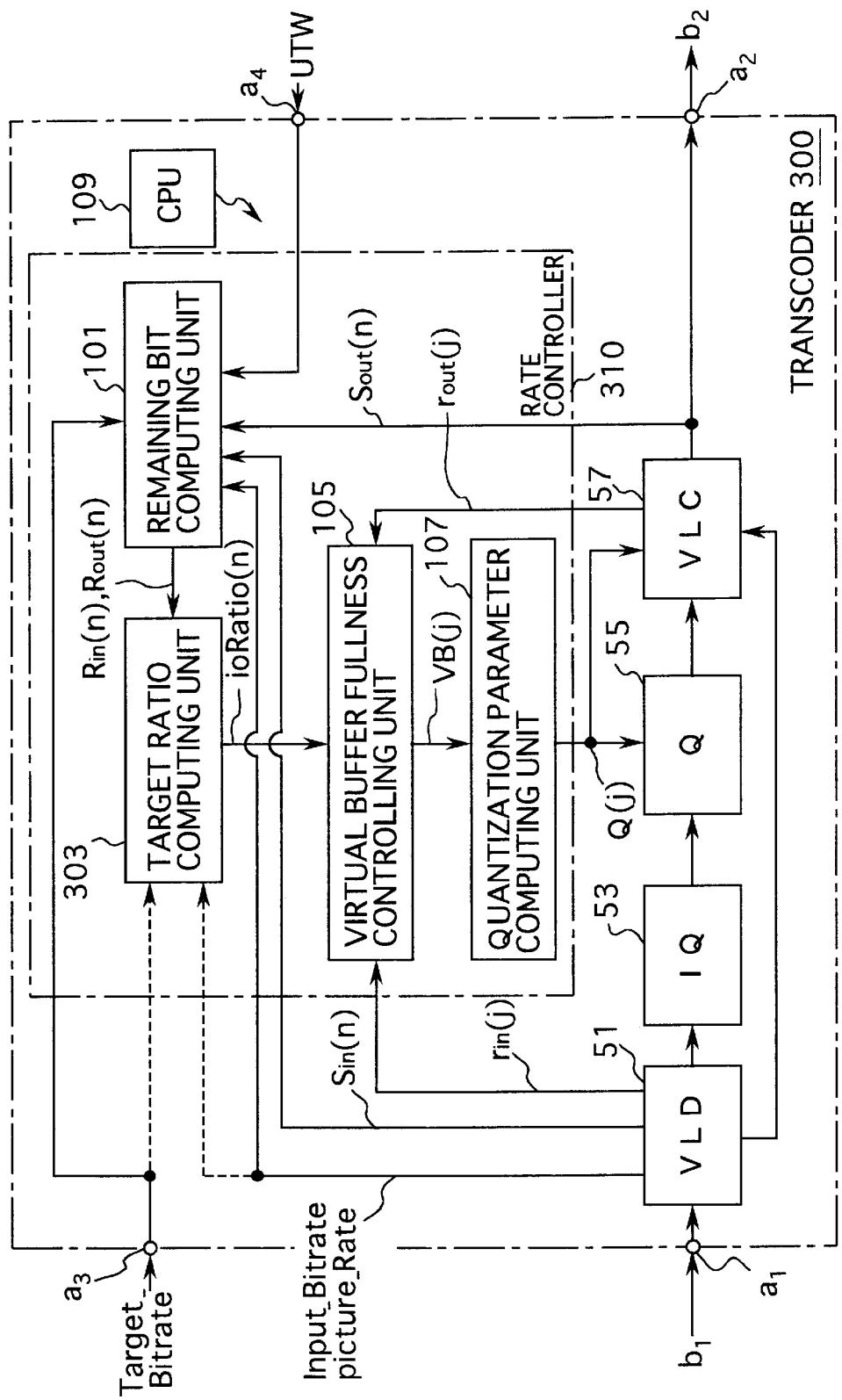
FIG. 6 is a block diagram of a fourth preferred embodiment of the apparatus for transcoding the coded moving picture sequence according to the present invention.

Referring now to FIG. 6 of the drawing, there is shown a fourth preferred embodiment of the apparatus for transcoding the coded moving picture sequence according to the present invention as a transcoder 300. The fourth embodiment of the transcoder 300 comprises a rate controller 310 instead of the rate controller 110 of the first embodiment of the transcoder 100 shown in FIG. 1. The rate controller 310 of the transcoder 300 comprises a target ratio computing unit 303 and the same constitutional elements as those of the first embodiment of the transcoder 100 shown in FIG. 1 except for the target ratio computing unit 103. These same constitutional elements are simply represented by the same reference numerals as those of the first embodiment of the transcoder 100 shown in FIG. 1, and will be thus omitted from description for avoiding tedious repetition.

The target ratio computing unit 303 is electrically connected to the remaining bit computing unit 101 and designed to input the remaining numbers of inputting and outputting bits $R_{in}(n)$ and $R_{out}(n)$ of the current picture pic(n) from the remaining bit computing unit 101 to calculate a target ratio ioRatio(n) indicative of a ratio of the remaining number of outputting bits $R_{out}(n)$ to the remaining number of inputting bits $R_{in}(n)$ for each of the pictures pic(n) as follows:

$$ioRatio(n) = \frac{Rout(n)}{Rin(n)} \times w_{i,p,b} \quad \text{equation (46)}$$

where $w_{i,p,b}$ are weighting parameters for determining the weight for I, P and B-pictures, respectively, thereby making it possible to control the number of coding bits for each type of pictures. When the pictures have no need to be weighted, 1.0 may be assigned to the corresponding weighting parameters $w_{i,p,b}$. In order to weight the pictures, the corresponding weighting parameter $w_{i,p,b}$ may become smaller than 1.0.

For example, the larger ratio of the output bit rate to the input bit rate is liable to cause the quality of the image to deteriorate. In order to prevent the deterioration in the quality of the image, the weighting parameters $w_{i,p,b}$ may be varied to determine the weight of the corresponding pictures.

In another embodiment, in order to fix the total number of encoding bits within the GROUP OF PICTURES at the same level throughout the transcoding process for the target moving picture sequence, the relationship between the weighting parameters $w_{i,p,b}$ and the number of corresponding pictures within GROUP OF PICTURES may be restricted under the following condition:

$$R_i N_i + R_p N_p + R_b N_b = R_i w_i N_i + R_p w_p N_p + R_b w_b N_b \quad \text{equation (47)}$$

where $N_i$, $N_p$ and $N_b$ are the number of pictures of I, P and B-pictures, respectively, within the GROUP OF PICTURES. $N_i$, $N_p$ or $N_b$ is given as follows:

$$N_i = 1 \quad \text{equation (48)}$$

$$N_p = N/M - 1 \quad \text{equation (49)}$$

$$N_b = N - N/M \quad \text{equation (50)}$$

In the above equation (47), $R_i$, $R_p$, and $R_b$ are the average number of bits within one picture for the I, P and B-pictures, respectively. N is a number of I-pictures within the GROUP OF PICTURE, while M is a picture rate of P or B-pictures within each of the GROUP OF PICTURES.

When the numbers of coding bits for both of I and P-pictures are increased at the same to the number of inputting bits for corresponding pictures, the weighting parameters for the corresponding pictures conclude with the condition: $w_i = w_p$. For this reason, the weighting parameter $w_b$ for the B-picture may be given by:

$$w_b = \frac{(R_i N_i + R_p N_p)(1 - w_i) + R_b N_b}{R_b N_b} \quad \text{equation (51)}$$

For example, the weighting parameters $w_i$ and $w_p$ were set at less than 1.0. In this case, the number of encoding bits of the I and P-pictures were increased, while the number of encoding bits of the B-picture was reduced. On the other hand, the S/N ratio can be ameliorated, as the weighting parameters $w_i$ and $w_p$ became smaller and the weighting parameter $w_b$ became lager. Furthermore, the method according to the present invention can improve to remarkably reduce the delay in transcoding from 100–500 msec to less than 50 msec in comparison with the conventional method.

The target ratio ioRatio computed by the target ratio computing unit 303 is then outputted to the virtual buffer fullness controlling unit 105. The transcoder 300 of the fourth embodiment is then operated according to the same process as the first or second embodiment shown in FIG. 2 or 4 except for the steps D8 or F3 wherein the target ratio ioRatio is computed in accordance with the above equation (46) by the target ratio computing unit 303.

The fourth embodiment of the apparatus and method for transcoding the coded moving picture sequence according to the present invention has an advantage over the prior art in achieving the control of the delay in transcoding as well as the same function and effect as those of the first through third second embodiments.

In the fourth embodiment, the transcoder 300 may comprise the virtual buffer fullness controlling unit 205 same as that of the third embodiment shown in FIG. 5 instead of the virtual buffer fullness controlling unit 105 shown in FIG. 6. In this case, the transcoder has an advantage over the prior art in achieving the control of the delay in transcoding as well as the same function and effect as those of the third embodiments.

It will be appreciated from the above description that the apparatus, method and computer program product for transcoding the coded moving picture sequence according to the present invention has an advantage over the prior art in that no need of information excluded from the coded moving picture sequence signal and no limitation in the form of the coded moving picture sequence signal prepared by the encoder in order to real timely and effectively reduce the bit rate of the coded moving picture sequence with low delay.

Figure 7:
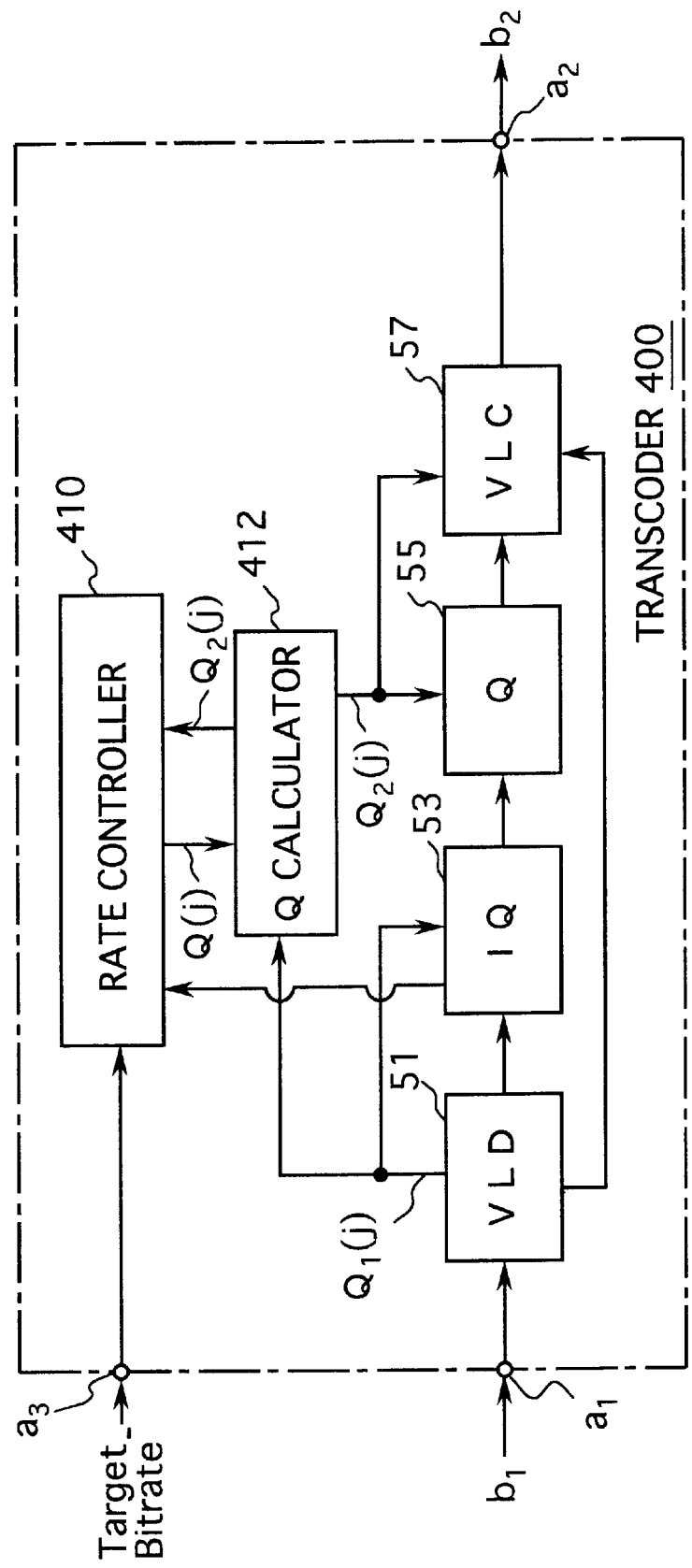
FIG. 7 is a block diagram of a fifth preferred embodiment of the apparatus for transcoding the coded moving picture sequence according to the present invention.

Referring now to FIG. 7 of the drawings, there is shown a fifth preferred embodiment of the apparatus for transcoding the coded moving picture sequence according to the present invention as a transcoder 400.

The transcoder 400 of this embodiment comprises a rate controller 410, a quantization parameter calculator 412, referred to as "Q calculator" in FIG. 7, and the same constitutional elements as those of the conventional transcoder 50 shown in FIG. 13 except for the rate controller 59. These same constitutional elements are simply represented by the same reference numerals as those of the conventional transcoder 50 shown in FIG. 13, and will be thus omitted from description for avoiding tedious repetition.

The rate controller 410 is electrically connected to the de-quantizer 53 and designed to input, from the de-quantizer 53, the information necessary to perform the rate control over the quantization in the quantizer 55. The rate controller 410 is designed to compute and output the re-quantization parameter, referred to as "Q(j)", for each of the macroblocks MB(j) to the quantization parameter calculator 412.

The quantization parameter calculator 412 is electrically connected to the variable length decoder 51 and designed to input the first quantization parameter $Q_1(j)$ for each of macroblocks MB(j) from the variable length decoder 51. The quantization parameter calculator 412 is further electrically connected to the rate controller 410 and designed to input the re-quantization parameter Q(j) for each of macroblocks MB(j) from the rate controller 410. The quantization parameter calculator 412 is further designed to calculate the second quantization parameter $Q_2(j)$ for each of macroblocks MB(j) by correcting the re-quantization parameter Q(j) on the basis of the first quantization parameter $Q_1(j)$ for each of macroblocks MB(j). The detailed description of this calculation will be made later. The calculated second quantization parameter $Q_2(j)$ for each of macroblocks MB(j) is then transmitted from the quantization parameter calculator 412 to the rate controller 410, the quantizer 55 and the variable length encoder 57.

The rate controller 410 is operable to perform the feedback control on the basis of the second quantization parameter $Q_2(j)$. The quantizer 55 is operable to perform the rate control on the basis of the transmitted second quantization parameter $Q_2(j)$. Furthermore, the variable length encoder 57 is operable to generate the objective picture data including the transmitted second quantization parameter $Q_2(j)$ to output the second bit streams $b_2$.

The calculation in the quantization parameter calculator 412 is performed on the basis of the following theory and experimental simulation results.

Figure 9:
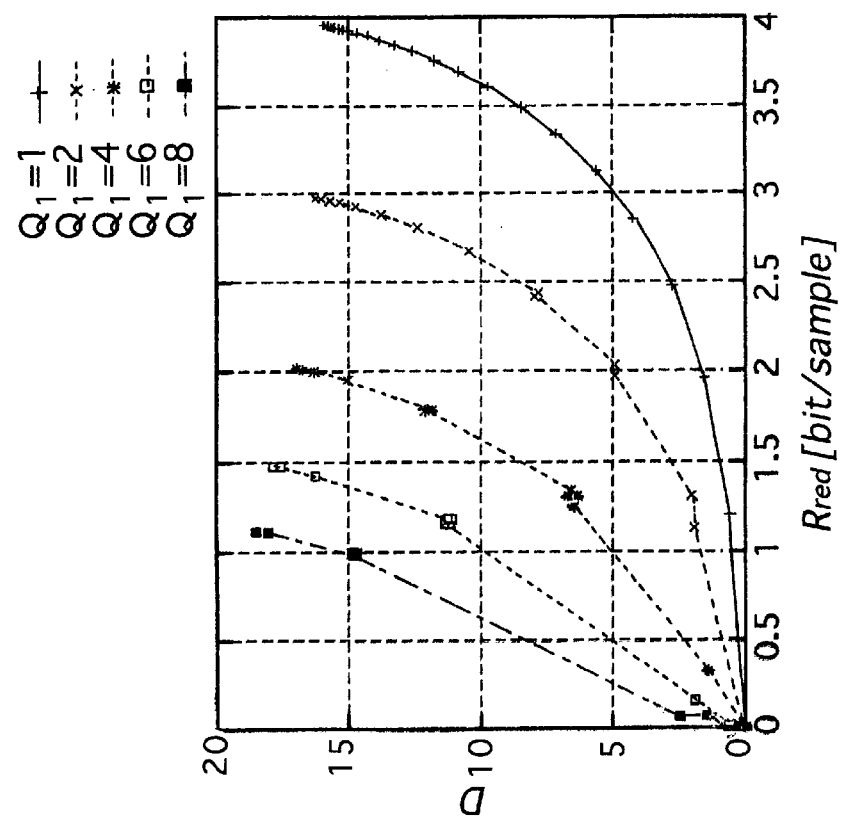
FIG. 9 is a graph showing the simulation results for characteristics of the relationship between the average quantization error and the reduced information volume for the inter macroblock in the transcoder shown in FIG. 7.
Figure 8:
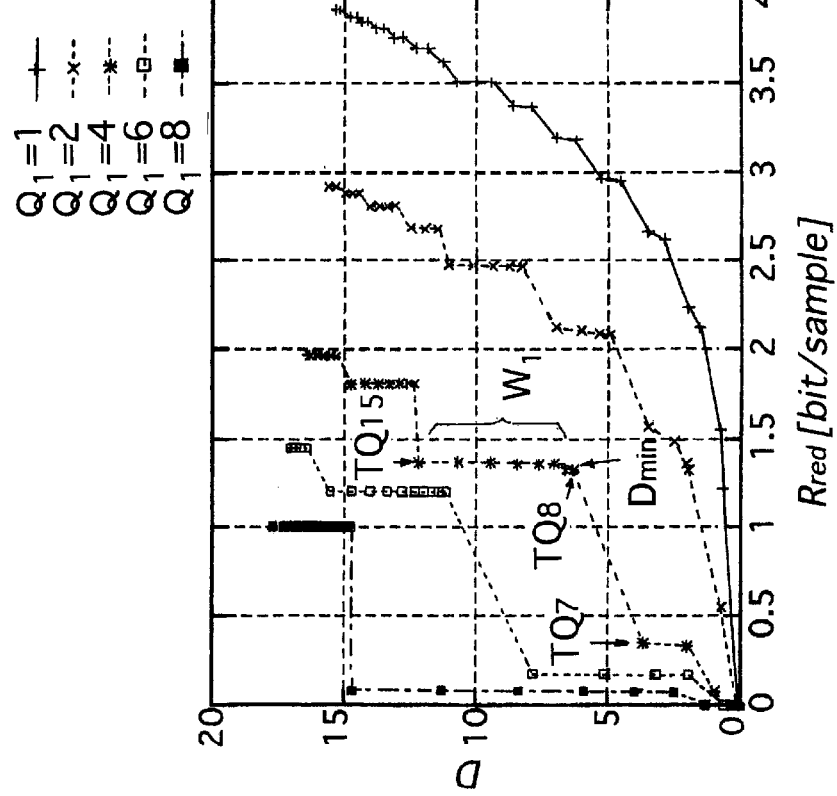
FIG. 8 is a graph showing the simulation results for characteristics of the relationship between the average quantization error and the reduced information volume for the intra macroblock in the transcoder shown in FIG. 7.

Referring to FIGS. 8 and 9 of the drawings, there are shown graphs of the experimental simulation results for characteristics of the relationship between an average quantization error "D" and a reduced information volume "$R_{red}$". FIG. 8 shows a graph for the intra macroblock, while FIG. 9 shows a graph for the inter macroblock. The characteristics of the relationship between the average quantization error D and the reduced information volume $R_{red}$ are representative of the rate-distortion performance in converting the first quantization level ($Q_1 \times$level) into the second quantization level ($Q_2 \times$tlevel).

The average quantization error D is derived as follows:

$$D = \sum_{-\infty}^{\infty} \{d(level)\}^2 P(level) \quad \text{equation (52)}$$

where d(level) is a difference between the first quantization level ($Q_1 \times$level) and the second quantization level ($Q_2 \times$tlevel), while P(level) is a quantization level probability of generating the quantization coefficients level.

The difference d(level) is given depending on the types of macroblocks as follows:

$$d_{inter}(level) = Q_1 \times level - Q_2 \times \qquad \text{equation (53)}$$
$$\left[ \left\lfloor \{2 \times level + sign(level)\} \times \frac{Q_1 \times QM}{32} \right\rfloor \times \frac{16}{Q_1 \times QM} \right]$$

or $$d_{intra}(level) = \qquad \text{equation (54)}$$
$$Q_1 \times level - Q_2 \times \left[ \left\lfloor level \times \frac{Q_1 \times QM}{16} \right\rfloor \times \frac{16}{Q_2 \times QM} + sign\left( level \times \frac{Q_1 \times QM}{16} \right) \times \frac{1}{2} \right]$$

where the above equation (53) is used for the inter macroblock, while the equation (54) is used for the intra macroblock. The inputted DCT coefficients may be assumed to be a Laplacian distribution. In this case, the typical density function of the probability may be applicable to the DCT coefficients p(x) as follows:

$$p(x) = \frac{1}{\sqrt{2}\sigma} \exp\left\{ \frac{-\sqrt{2}|x|}{\sigma} \right\} \qquad \text{equation (55)}$$

The quantization level probability P(level) is then given on the basis of the above equation (55) as:

$$P(level) = \qquad \text{equation (56)}$$
$$\int_{(level-\frac{1}{2})Q_1}^{(level+\frac{1}{2})Q_1} p(x) dx = \int_{(level-\frac{1}{2})Q_1}^{(level+\frac{1}{2})Q_1} \frac{1}{\sqrt{2}\sigma} \exp\left\{ \frac{-\sqrt{2}|x|}{\sigma} \right\}$$

The above equation (52) is evaluated by replacing d(level) with the above equation (53) or (54), and replacing P(level) with the equation (56), and simplified to lead to a function of only $Q_i$, $Q_2$, and level.

On the other hand, the reduced information volume $R_{red}$ is derived as follows:

$$R_{red} = R_{org} - R_{avg} \qquad \text{equation (57)}$$

where $R_{org}$ is an original average information volume indicative of the average information volume of the original quantization coefficients level before reducing the number of bits, while $R_{avg}$ is an average information volume indicative of the average of information volume of the re-quantization coefficients tlevel after reducing the number of bits.

The original average information volume $R_{org}$ is derived by:

$$R_{org} = \sum_{-\infty}^{\infty} P(level) \times I(level) \qquad \text{equation (58)}$$

where I(level) is a self-information volume of the quantization coefficients level and given on the basis of the probability P(level) as follows:

$$I(level) = -\log_2 P(level) \qquad \text{equation (59)}$$

The original average information volume $R_{org}$ is then derived by:

$$R_{org} = -\sum_{-\infty}^{\infty} P(level) \log_2 P(level) \qquad \text{equation (60)}$$

The self-information volume I(tlevel) of the re-quantization coefficients tlevel is similarly given by the probability P(tlevel) as follows:

$$I(tlevel) = -\log_2 P(tlevel) \qquad \text{equation (61)}$$

The average information volume $R_{avg}$ is similarly derived by:

$$R = -\sum_{-\infty}^{\infty} P(tlevel) \log_2 P(tlevel) \qquad \text{equation (62)}$$

The experimental simulations shown in FIGS. 8 and 9 were, conducted under the following condition:

σ4.0; and $Q_2$ was varied between integers 1 and 31 in each case where 1, 2, 4, 6, or 8 was substituted for $Q_1$.

It will be apparent from the graphs shown in FIGS. 8 and 9 that the average quantization error D can be reduced in both of the inter and intra macroblocks as the first quantization parameter $Q_1$ becomes smaller. This means that the minute de-quantization performed by the de-quantizer 53 can causes the average quantization error D to decrease, thereby efficiently reducing the information volume.

In the intra macroblock, the characteristic in the rate-distortion performance in converting the quantization levels is represented by five stepped waveforms for each of $Q_1$=1, 2, 4, 6, and 8 denoted by symbols (+), (×), (*), (□), and (■), respectively, as shown in FIG. 8. Particularly, as the first quantization parameter $Q_1$ becomes larger, the stepped waveforms in the rate-distortion performance characteristic tend to become coarse and sharp. This leads to the fact that not only the efficiency is declined, but also the reduced information volume is liable to restrict itself. For example, there were only two values of the reduced information volume $R_{red}$ as shown in the leftmost stepped waveform (■), i.e., wherein the first quantization parameter $Q_1$ is equal to 8.

Furthermore, even though the reduced information volume $R_{red}$ is constant with respect to the first quantization parameters $Q_1$ on a vertical line area, one of which is represented by the reference numeral "$W_1$" in FIG. 8, within the stepped waveform, the average quantization error D will be variable in accordance with the value of the second quantization parameter $Q_2$. As a result, the average quantization error D is apt to increase but the information volume nevertheless prevents from reducing, when the selection of the second quantization parameter $Q_2$ is made with taking no account of the characteristic in the rate-distortion performance in converting the quantization levels.

In the meantime, the inter macroblock has the different characteristic in the rate-distortion performance in converting the quantization levels from that of the intra macroblock as shown in FIG. 9. The characteristic in the rate-distortion performance in converting the quantization levels is represented by five relatively smooth curved lines, for each of $Q_1$=1, 2, 4, 6, and 8, progressively increasing with respect to the second quantization parameter $Q_2$ as shown in FIG. 8. Particularly, the plots are liable to concentrate at a specific point having the larger second quantization parameter $Q_2$. Namely, the difference in the relationship between the reduced information volume and the average quantization error D becomes smaller with respect to the second quantization parameter $Q_2$, as the de-quantizer 53 is operated to perform the rougher de-quantization. This results in the fact that the characteristic in the rate-distortion performance in converting the quantization levels is constant over most of the second quantization parameters $Q_2$.

The characteristic in the rate-distortion performance in converting the quantization levels has some turning points, for example, "$TQ_7$" and "$TQ_{15}$", derived by the following equation (63) or (64):

$$Q_2(j)=(m+1)\times Q_1(j) \quad \text{equation (63)}$$

or $$Q_2(j)=2\times m\times Q_1(j)-1 \quad \text{equation (64)}$$

where m is natural numbers. The equation (63) is used for the inter macroblock, while the equation (64) is used for the intra macroblock.

As shown in FIG. 8, there are some vertical line areas in the stepped waveforms wherein the reduced information volume $R_{red}$ is constant. The first quantization parameter $Q_1$ is equal to 4, and the reduced information volume $R_{red}$ is nearly equal to 1.32 within the vertical line area $W_1$. The average quantization error D can have individual values respectively corresponding to the individual second quantization parameters $Q_2$ the within the vertical line area $W_1$. One of the second quantization parameter $Q_2$ corresponding to the minimum average quantization error $D_{min}$ may be preferably selected from among a plurality of values within the vertical line area $W_1$.

In order to select the above appropriate value of the second quantization parameter $Q_2$, the second quantization parameter $Q_2$ for the inter macroblock is fixed at "(m+1)× $Q_1$" when the second quantization parameter $Q_2$ is less than "(m+2)×$Q_1$" and more than or equal to "(m+1)×$Q_1$". Here, m is a natural numbers. On the other hand, the second quantization parameter $Q_2$ for the intra macroblock is fixed at "2m×$Q_1$" when the second quantization parameter $Q_2$ is less than "2(m+1)×$Q_1$" and more than or equal to "2m×$Q_1$".

On the basis of the above theory, the quantization parameter calculator 412 is operated to compute the second quantization parameter $Q_2$ in accordance with the following equations (65) and (66) depending on the types of macroblocks:

$$Q_2(j) = Q_1(j) \times \left\lfloor \frac{Q(j)}{Q_1(j)} \right\rfloor \quad \text{or} \quad \text{equation (65)}$$

$$Q_2(j) = 2 \times Q_1(j) \times \left\lfloor \frac{(Q(j))}{2 \times Q_1(j)} \right\rfloor \quad \text{equation (66)}$$

where the equation (65) is used for the inter macroblock, while the equation (66) is used for the intra macroblock.

The operation of the transcoder 400 will be described hereinlater.

When the first quantization parameter $Q_1(j)$ for the intra macroblock is 4 and the re-quantization parameter Q(j) is assumed to be 15 by the rate controller 410, the quantization parameter calculator 412 is operated to compute the second quantization parameter $Q_2(j)$ of 8 in accordance with the above equation (65). When the re-quantization parameter Q(j) is assumed to be 14, 13, 12, 11, 10, or 9, the quantization parameter calculator 412 is also operated to compute the second quantization parameter $Q_2(j)$ of 8 in accordance with the above equation (65).

As shown in FIG. 8, when the first quantization parameter $Q_1(j)$ is 4, the same reduced information volume $R_{red}$ can be obtained by the some re-quantization parameters Q(j) on the vertical line areas $W_1$, i.e., 8 to 15. When the second quantization parameter $Q_2(j)$ is 8, which is represented by the point $TQ_8$, the lowest average quantization error $D_{min}$ could be obtained. Consequently, the present invention can achieve the low average quantization error and larger reduced information volume.

The fifth embodiment of the transcoder 400 thus constructed can compute the appropriate re-quantization parameter on the basis of the de-quantization parameter with taking account of the rate distortion performance in converting the quantization level. Furthermore, the fifth embodiment of the transcoder 400 can reduce the quantization error even if the reduced information volume is increased. As a result, it is possible for any coded moving picture sequence signals and any types of pictures to achieve the appropriate rate control.

Figure 10:
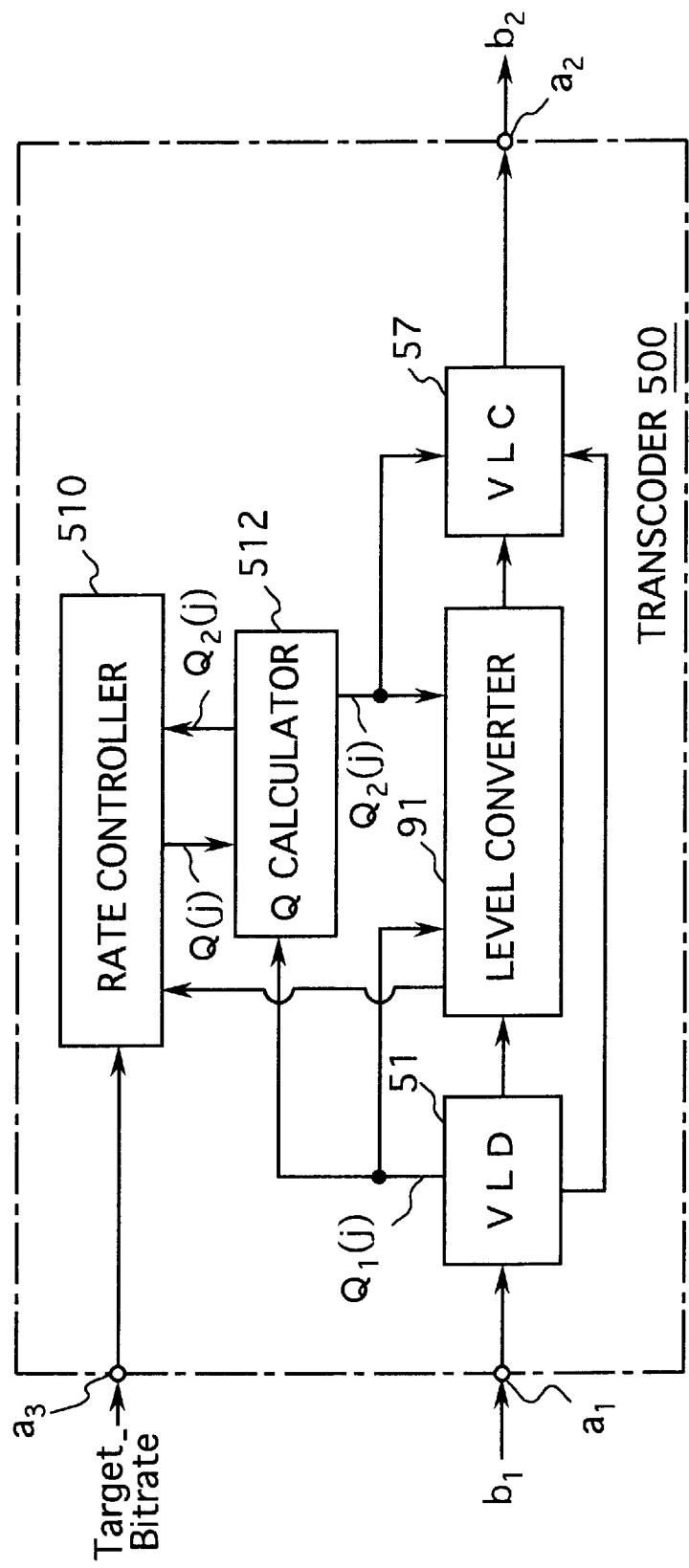
FIG. 10 is a block diagram of a sixth preferred embodiment of the apparatus for transcoding the coded moving picture sequence according to the present invention.

Referring now to FIG. 10 of the drawings, there is shown a sixth preferred embodiment of the apparatus for transcoding the coded moving picture sequence according to the present invention as a transcoder 500.

Figure 19:
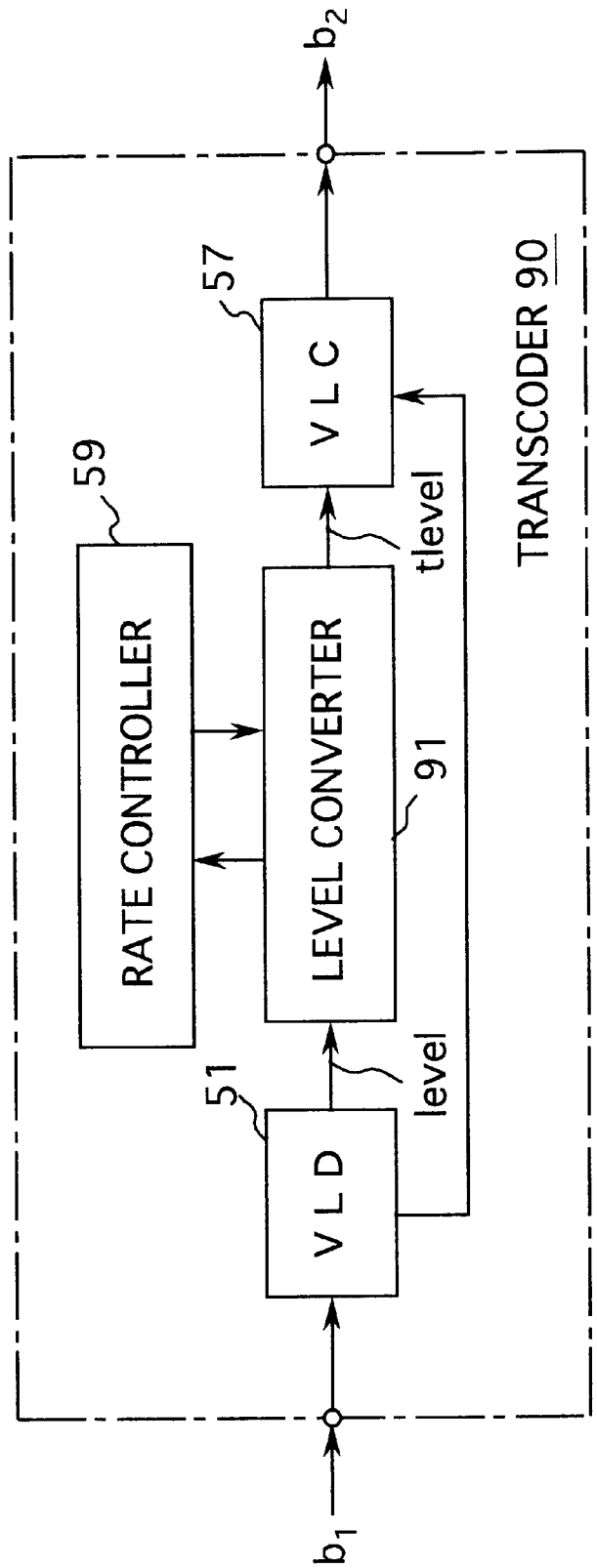
FIG. 19 is a schematic block diagram showing a fourth conventional transcoder.

The transcoder 500 of this embodiment comprises a rate controller 510, a quantization parameter calculator 512, referred to as "Q calculator" in FIG. 10, and the same constitutional elements as those of the conventional transcoder 90 shown in FIG. 19 except for the rate controller 59. These same constitutional elements are simply represented by the same reference numerals as those of the conventional transcoder 90 shown in FIG. 19, and will be thus omitted from description for avoiding tedious repetition.

The rate controller 510 is electrically connected to the level converter 91 and designed to input, from the level converter 91, the information necessary to perform the rate control over the quantization level conversion in the level converter 91. The rate controller 510 is designed to compute and output the re-quantization parameter, referred to as "Q(j)", for each of the macroblocks MB(j) to the quantization parameter calculator 512.

The quantization parameter calculator 512 is electrically connected to the variable length decoder 51 and designed to input the first quantization parameter $Q_1(j)$ for each of macroblocks MB(j) from the variable length decoder 51. The quantization parameter calculator 512 is further electrically connected to the rate controller 510 and designed to input the re-quantization parameter Q(j) for each of macroblocks MB(j) from the rate controller 510. The quantization parameter calculator 512 is further designed to calculate the second quantization parameter $Q_2(j)$ for each of macroblocks MB(j) by correcting the re-quantization parameter Q(j) on the basis of the first quantization parameter $Q_1(j)$ for each of macroblocks MB(j). The detailed description of this calculation will be made later. The calculated second quantization parameter $Q_2(j)$ for each of macroblocks MB(j) is then transmitted from the quantization parameter calculator 512 to the rate controller 510, the level converter 91 and the variable length encoder 57.

The rate controller 510 is operable to perform the feedback control on the basis of the second quantization parameter $Q_2(j)$. The level converter 91 is operable to perform the rate control on the basis of the transmitted second quantization parameter $Q_2(j)$. Furthermore, the variable length encoder 57 is operable to generate the objective picture data including the transmitted second quantization parameter $Q_2(j)$ to output the second bit streams $b_2$.

The selection in the quantization parameter calculator 512 is performed on the basis of the following theory and experimental simulation results.

Referring to FIGS. 11 and 12 of the drawings, there are shown graphs of the experimental simulation results for characteristics of the relationship between an average quantization error D and a reduced information volume $R_{red}$. FIG. 11 shows a graph for the intra macroblock, while FIG. 12 shows a graph for the inter macroblock. The characteristics of the relationship between the average quantization error D and the reduced information volume $R_{red}$ are representative of the rate-distortion performance in converting the first quantization level ($Q_1 \times$level) into the second quantization level ($Q_2 \times$tlevel).

The rate distortion performance in converting the quantization level can be verified by a relationship between a reduced volume of coded information data and an average of differences in the quantization level. The differences d(level) between the first quantization level ($Q_1 \times$level) and the second quantization level ($Q_2 \times$tlevel) are given depending on the types of macroblocks as follows:

$$d_{inter}(level) = qScale \times level - tqScale \times \left\lfloor \frac{qScale}{tqScale} \times \left\{ level + \frac{sign(level)}{2} \right\} \right\rfloor \quad \text{equation (67)}$$

or $$d_{intra}(level) = qScale \times level - tqScale \times \left\lfloor \frac{qScale}{tqScale} \times level + \frac{sign(level)}{2} \right\rfloor \quad \text{equation (68)}$$

where the above equation (67) is used for the inter macroblock, while the equation (68) is used for the intra macroblock. In this embodiment, the inputted DCT coefficients may be also assumed to be a Laplacian distribution. Accordingly, the average quantization error D may be also obtained by the above equation (52), while the reduced information volume $R_{red}$ may be also obtained by the above equation (57).

The experiment results shown in FIGS. 11 and 12 were conducted under the following condition:

σ=4.0; and $Q_2$ was varied between integers 1 and 31 in each case where 1, 2, 4, 6, or 8 was substituted for $Q_1$.

It will be apparent from the graphs shown in FIGS. 11 and 12 that the average quantization error D can be reduced in both of the inter and intra macroblocks as the first quantization parameter $Q_1$ becomes smaller. This means that the minute first quantization parameter $Q_1$ can cause the average quantization error D to decrease, thereby efficiently reducing the information volume.

In the intra macroblock, the characteristic in the rate-distortion performance in converting the quantization levels is represented by five stepped waveforms for each of $Q_1=1$, 2, 4, 6, and 8 denoted by symbols (+), (×), (*), (□), and (■), respectively, as shown in FIG. 11. Particularly, as the first quantization parameter $Q_1$ becomes larger, the stepped waveforms in the rate-distortion performance characteristic tend to become coarse and sharp. This leads to the fact that not only the efficiency is declined, but also the reduced information volume is liable to restrict itself. For example, there were only two values of the reduced information volume $R_{red}$ as shown in the leftmost stepped waveform (■), i.e., wherein the first quantization parameter $Q_1$ is equal to 8.

Furthermore, even though the reduced information volume $R_{red}$ is constant with respect to the first quantization parameter $Q_1$ on a vertical line area, one of which is represented by the reference numeral "$W_2$" in FIG. 11, within the stepped waveform, the average quantization error D will be variable in accordance with the value of the second quantization parameter $Q_2$. As a result, the average quantization error D is apt to increase but the information volume nevertheless prevents from reducing, when the selection of the second quantization parameter $Q_2$ is made with taking no account of the characteristic in the rate-distortion performance in converting the quantization levels.

In the meantime, the inter macroblock has the different characteristic in the rate-distortion performance in converting the quantization levels from that of the intra macroblock as shown in FIG. 12. The characteristic in the rate-distortion performance in converting the quantization levels is represented by five relatively smooth curved lines, for each of $Q_1=1, 2, 4, 6,$ and 8, progressively increasing with respect to the second quantization parameter $Q_2$ as shown in FIG. 11. Particularly, the plots are liable to concentrate at a specific point having the larger second quantization parameter $Q_2$. Namely, the difference in the relationship between the reduced information volume and the average quantization error D becomes smaller with respect to the second quantization parameter $Q_2$, as the second quantization parameter $Q_2$ becomes smaller. This results in the fact that the characteristic in the rate-distortion performance in converting the quantization levels is constant over most of the second quantization parameters $Q_2$.

The characteristic in the rate-distortion performance in converting the quantization levels has some turning points, for example, "$TQ_8$" and "$TQ_{16}$", derived by the following equations (69) and (70):

$$Q_2(j) = (m+1) \times Q_1(j) \quad \text{equation (69)}$$

or $$Q_2(j) = 2 \times m \times Q_1(j) \quad \text{equation (70)}$$

where the equation (69) is used for the inter macroblock, while the equation (70) is used for the intra macroblock.

As shown in FIG. 11, there are some vertical line areas in the stepped waveforms wherein the reduced information volume $R_{red}$ is constant. The first quantization parameter $Q_1$ is equal to 4, and the reduced information volume $R_{red}$ is nearly equal to 1.32 within the vertical line area $W_2$. The average quantization error D can have individual values respectively corresponding to the individual second quantization parameters $Q_2$ the within the vertical line area $W_2$. One of the second quantization parameter $Q_2$ corresponding to the minimum average quantization error $D_{min}$ may be preferably selected from among a plurality of values within the vertical line area $W_2$.

In order to select the above appropriate value of the second quantization parameter $Q_2$, the second quantization parameter $Q_2$ for the inter macroblock is fixed at "(m+1)×$Q_1$" when the second quantization parameter $Q_2$ is less than "(m+2)×$Q_1$" and more than or equal to "(m+1)×$Q_1$". Here, m is a natural numbers. On the other hand, the second quantization parameter $Q_2$ for the intra macroblock is fixed at "2m×$Q_1$+1" when the second quantization parameter $Q_2$ is less than or equal to "2(m+1)×$Q_1$" and more than "2m×$Q_1$".

The sixth embodiment of the transcoder 500, for example, has the turning points $TQ_8$ and $TQ_9$ corresponding to the second quantization parameters $Q_2$ of "8" and "9", respectively, as shown in FIG. 11. On the other hand, the fifth embodiment of the transcoder 400, for example, has the turning points $TQ_7$ and $TQ_8$ corresponding to the second quantization parameters $Q_2$ of "7" and "8", as shown in FIG. 8. Thus, the sixth embodiment of the transcoder 500 has another characteristic in the rate-distortion performance in converting the quantization levels in compared with that of the fifth embodiment of the transcoder 400. It is therefore necessary for the sixth embodiment of the transcoder 500 to provide with the different quantization parameter calculator 512 from the quantization parameter calculator 412 of the fifth embodiment of the transcoder 400 as described below.

In the transcoder 500 of the sixth embodiment, the quantization parameter calculator 512 is operated to compute the second quantization parameter $Q_2$ in accordance with the following equations (71) and (72) depending on the types of macroblocks:

$$Q_2(j) = Q_1(j) \times \left\lfloor \frac{Q(j)}{Q_1(j)} \right\rfloor \quad \text{or} \quad \text{equation (71)}$$

$$Q_2(j) = 2 \times Q_1(j) \times \left\lfloor \frac{Q(j)-1}{2 \times Q_1(j)} \right\rfloor + 1 \quad \text{equation (72)}$$

where the equation (71) is used for the inter macroblock, while the equation (72) is used for the intra macroblock.

The operation of the transcoder 500 will be described hereinlater.

When the first quantization parameter $Q_1(j)$ for the intra macroblock is 4 and the re-quantization parameter $Q(j)$ is assumed to be 16 by the rate controller 510, the quantization parameter calculator 512 is operated to compute the second quantization parameter $Q_2(j)$ of 9 in accordance with the above equation (69). When the second re-quantization parameter $Q(j)$ is assumed to be 15, 14, 13, 12, 11, or 10, the quantization parameter calculator 512 is also operated to compute the second quantization parameter $Q_2(j)$ of 9 in accordance with the above equation (69).

As shown in FIG. 11, when the first quantization parameter $Q_1(j)$ is 4, the same reduced information volume $R_{red}$ can be obtained by the some re-quantization parameters $Q(j)$ on the vertical line areas $W_2$, i.e., 9 to 16. When the second quantization parameter $Q_2(j)$ is 9, which is represented by the point $TQ_9$, the lowest average quantization error $D_{min}$ could be obtained. Consequently, the present invention can achieve the low average quantization error and larger reduced information volume.

The experimental simulation test was conducted for the evaluation of the method and apparatus of this embodiment under the following condition. Two types of test sequences, such as "BUS sequence", and "Table Tennis sequence" were used for the test in order to verify that the method and apparatus of this embodiment is independent of the types of test sequences. The test sequences were coded by a typical encoder, not shown, to generate the first bit streams having a bit rate of 6, 9, 12 or 15 Mbps to be input to the transcoder 500. The picture structure was assumed to be a frame structure. In this experimental simulation test, the number of frames was 150. Each of the test sequences was coded into a MPEG-2 MP@ML format, having a number of pictures in GROUP OF PICUTRES N equals to 15, and an I or P-picture of M equals to 3, by a frame and field motion compensation method. In the test sequences, an image has an International Telegraph Union Radiocommunication Section (ITU-R) recommendation BT.601 4:2:0 format: 704 pels×480 lines brightness signals; and 352 pels×240 lines color difference signals.

The input bit streams were transcoded to change from the original bit rate in the input bit streams to a target bit rate of 5 Mbps in the output bit steams. A comparative experimental simulation test was conducted without selecting appropriate reference quantization parameter.

According to the experimental simulation test results, the S/N ratio value in the output bit streams obtained by the transcoder 500 of this embodiment can be effectively increased in comparison with the conventional transcoder. In particular, the S/N ratio value in the output bit streams obtained by the transcoder 500 of this embodiment could be improved, as the bit rate of the input bit streams becomes lower. Namely, the method according to the present invention is effective for the input bit streams having the lower bit rate in improving its S/N ratio value.

Furthermore, it will be understood from the experimental simulation test results that the most improvement of the S/N ratio could be achieved in the I-picture. This effect was produced by performing the rate control on the basis of the characteristic in the rate-distortion performance in converting the quantization levels represented by stepped waveforms in the inter macroblocks as shown in FIG. 11.

As shown in FIG. 11, the smaller first quantization parameter $Q_1$ causes the sharper variation in the characteristic in the rate-distortion performance in converting the quantization levels in comparison with the larger first quantization parameter $Q_i$. This means that the method according to the present invention, in which the re-quantization parameter $Q_2$ can be selected appropriately, is effective in transcoding the input bit streams having lower bit rate because of the fact that the input bit streams having the lower bit rate has the larger the first quantization parameter $Q_1$ to cause the sharper variation in the characteristic in the rate-distortion performance in converting the quantization levels.

The sixth embodiment of the transcoder 500 thus constructed can compute the appropriate re-quantization parameter on the basis of the de-quantization parameter with taking account of the rate distortion performance in converting the quantization level. Furthermore, the sixth embodiment of the transcoder 500 can reduce the quantization error as well as to increase the reduced information volume, thereby making it possible to achieve the effective rate control.

What is claimed is:

1. A method of transcoding a coded moving picture sequence, comprising the steps of:
    (a) inputting a first coded moving picture sequence signal at an input bit rate, said first coded moving picture sequence signal consisting of a series of pictures;
    (b) computing an estimated number of inputting bits to be input in said inputting step (a) for a predetermined duration on the basis of said input bit rate of said first coded moving picture sequence signal;
    (c) decoding said first coded moving picture sequence signal inputted in said inputting step (a) to reconstruct an original picture data, for each of said pictures, having a number of real inputting bits;
    (d) computing, for each of said pictures, a remaining number of inputting bits after a previous picture in said first coded moving picture sequence signal is decoded in said decoding step (c) on the basis of said number of real inputting bits of said previous picture and said estimated number of inputting bits obtained in said computing step (b);
    (e) transforming, on the basis of a scaling factor, said original picture data reconstructed in said decoding step (c) for each of said pictures into an objective picture data having a number of real outputting bits less than said number of real inputting bits of said original picture data;
    (f) encoding said objective picture data obtained in said transforming step (e) to generate a second coded moving picture sequence signal;
    (g) outputting said second coded moving picture sequence signal generated in said encoding step (f) at a target bit rate lower than said input bit rate of said first coded moving picture sequence signal;
    (h) computing an estimated number of outputting bits to be output in said outputting step (g) for said predetermined duration on the basis of said target bit rate of said second coded moving picture sequence signal;

(i) computing, for each of said pictures, a remaining number of outputting bits after a previous picture in said second coded moving picture sequence signal is encoded in said encoding step (f) on the basis of said number of real outputting bits of said previous picture and said estimated number of outputting bits obtained in said computing step (h);

(j) computing, for each of said pictures, a target ratio of said remaining number of outputting bits computed in said computing step (i) to said remaining number of inputting bits computed in said computing step (d) before the original picture data is transformed in said transforming step (e); and (k) computing said scaling factor on the basis of said target ratio computed in said target ratio computing step (j) to control said target bit rate of said second coded moving picture sequence signal.

2. The method as set forth in claim 1, wherein said computing step (d) comprising the steps of:

(d1) initializing said remaining number of inputting bits of said current picture on the basis of said estimated number of inputting bits;

(d2) updating said remaining number of inputting bits of said current picture on the basis of said number of real inputting bits of the previous picture and said remaining number of inputting bits of the previous picture;

(d3) repeating said step (d2) for each of said pictures; and (d4) repeating said steps (d1) and (d3) at time intervals of said predetermined duration, and said computing step (h) further comprising the steps of:

(h1) initializing said remaining number of outputting bits of said current picture on the basis of said estimated number of outputting bits;

(h2) updating said remaining number of outputting bits of said current picture on the basis of said number of real outputting bits of the previous picture and said remaining number of outputting bits of the previous picture;

(h3) repeating the step (h2) for each of said pictures; and (h4) repeating the steps (h1) and (h3) at time intervals of said predetermined duration.

3. The method as set forth in claim 1, further comprising the step of repeating said steps (b), (d), (h) and (i) for each of said pictures.

4. The method as set forth in claim 1, wherein each of said pictures consists of a plurality of blocks, said decoding step (c) further having the step of deriving an original scaling factor from said first coded moving picture sequence signal, said transforming step (e) further comprising the steps of:

(e1) dividing said original picture data for each of said picture into a plurality of block data respectively corresponding to said blocks;

(e2) quantizing said block data for each of said blocks with said scaling factor; and (e3) repeating said steps (e1) and (e2) for each of said blocks within said picture to generate said objective picture data;

said step k) having the step of updating said scaling factor on the basis of said original scaling factor.

5. A method of transcoding a coded moving picture sequence, comprising the steps of:

(a) inputting a first coded moving picture sequence signal at an input bit rate, said first coded moving picture sequence signal consisting of a series of pictures;

(b) decoding said first coded moving picture sequence signal inputted in said inputting step (a) to reconstruct an original picture data, for each of said pictures, having a number of real inputting bits, and derive an original scaling factor;

(c) transforming, on the basis of a scaling factor, said original picture data reconstructed in said decoding step (b) for each of said pictures into an objective picture data having a number of real outputting bits less than said number of real inputting bits of said original picture data;

(d) encoding said objective picture data obtained in said transforming step (c) to generate a second coded moving picture sequence signal;

(e) outputting said second coded moving picture sequence signal generated in said encoding step (d) at a target bit rate lower than said input bit rate of said first coded moving picture sequence signal;

(f) computing a temporary scaling factor on the basis of said reconstructed original picture data to control said target bit rate of said second coded moving picture sequence signal; and (g) correcting said temporary scaling factor computed in said computing step (f) on the basis of said original scaling factor to derive said scaling factor for said transforming step (c).

6. An apparatus for transcoding a coded moving picture sequence, interposed between a first transmitting path and a second transmitting path, comprising:

inputting means for inputting a first coded moving picture sequence signal through said first transmitting path at an input bit rate, said first coded moving picture sequence signal consisting of a series of pictures;

decoding means for decoding said first coded moving picture sequence signal inputted through said inputting means to reconstruct an original picture data, for each of said pictures, having a number of real inputting bits;

transforming means for transforming, on the basis of a scaling factor, said original picture data reconstructed by said decoding means for each of said pictures into an objective picture data having a number of real outputting bits less than said number of real inputting bits of said original picture data;

encoding means for encoding said objective picture data obtained by said transforming means to generate a second coded moving picture sequence signal;

outputting means for outputting said second coded moving picture sequence signal generated by said encoding means through said second transmitting path at a target bit rate lower than said input bit rate of said first coded moving picture sequence signal; and rate controlling means for controlling said target bit rate of said second coded moving picture sequence signal, having:

(a) a remaining bit computing unit for computing:

an estimated number of inputting bits to be input through said inputting means for a predetermined duration on the basis of said input bit rate of said first coded moving picture sequence signal;

a remaining number of inputting bits for each of said pictures in said first coded moving picture sequence signal on the basis of said number of real inputting bits of a current picture and said estimated number of inputting bits;

an estimated number of outputting bits to be output through said outputting means for said predetermined duration on the basis of said target bit rate of said second coded moving picture sequence signal; and a remaining number of outputting bits for each of said pictures in said second coded moving picture sequence signal on the basis of said number of real outputting bits of a current picture and said estimated number of outputting bits;

(b) a target ratio computing unit for computing, for each of the pictures, a target ratio of the remaining number of outputting bits computed by the remaining bit computing unit to the remaining number of inputting bits of the picture computed by the remaining bit computing unit; and (c) a scaling factor computing unit for computing the scaling factor on the basis of the target ratio computed by the target ratio computing unit to control the target bit rate of the second coded moving picture sequence signal.

7. The apparatus as set forth in claim 6, further comprising controlling means for operating said remaining bit computing unit to:

update, for each of said pictures, said remaining number of inputting bits of the current picture on the basis of said number of real inputting bits of the previous picture and said remaining number of inputting bits of the previous picture;

update, for each of said pictures, said remaining number of outputting bits of the current picture on the basis of said number of real outputting bits of the previous picture and said remaining number of outputting bits of the previous picture;

initialize said remaining number of inputting bits of the current picture on the basis of said estimated number of inputting bits at time intervals of said predetermined duration; and initialize said remaining number of outputting bits of the current picture on the basis of said estimated number of outputting bits at time intervals of said predetermined duration.

8. The apparatus as set forth in claim 6, further comprising controlling means for operating said remaining bit computing unit to compute: for each of said pictures, said estimated number of inputting bits; said remaining number of inputting bits of the current picture; said estimated number of outputting bits; and said remaining number of outputting bits of the current picture.

9. The apparatus as set forth in claim 6, wherein each of said picture consists of a plurality of blocks, said decoding means being further operated to derive an original scaling factor from said first coded moving picture sequence signal, said transforming means being further operated to transform said original picture data for each of said picture into a block data for each of said blocks, and said controlling means being operated to update said scaling factor on the basis of said original scaling factor.

10. An apparatus for transcoding a coded moving picture sequence signal, interposed between a first transmitting path and a second transmitting path, comprising:

inputting means for inputting a first coded moving picture sequence signal through said first transmitting path at an input bit rate, said first coded moving picture sequence signal consisting of a series of pictures;

decoding means for decoding said first coded moving picture sequence signal inputted through said inputting means to reconstruct an original picture data, for each of said pictures, having a number of real inputting bits, and derive an original scaling factor;

transforming means for transforming, on the basis of a scaling factor, said original picture data reconstructed by said decoding means for each of said pictures into an objective picture data having a number of real outputting bits less than said number of real inputting bits of said original picture data;

encoding means for encoding said objective picture data obtained by said transforming means to generate a second coded moving picture sequence signal;

outputting means for outputting said second coded moving picture sequence signal generated by said encoding means through said second transmitting path at a target bit rate lower than said input bit rate of said first coded moving picture sequence signal;

rate controlling means for controlling said target bit rate of said second coded moving picture sequence signal by computing a temporary scaling factor on the basis of said reconstructed original picture data; and correcting means for correcting said temporary scaling factor computed by said rate controlling means on the basis of said original scaling factor to derive said scaling factor for transforming means.

11. A computer program product comprising a computer usable storage medium having computer readable code embodied therein for transcoding a coded moving picture sequence signal, said computer readable code comprising:

(a) computer readable program code for inputting a first coded moving picture sequence signal at an input bit rate, said first coded moving picture sequence signal consisting of a series of pictures;

(b) computer readable program code for computing an estimated number of inputting bits to be input by said computer readable program code (a) for a predetermined duration on the basis of said input bit rate of said first coded moving picture sequence signal;

(c) computer readable program code for decoding said first coded moving picture sequence signal inputted by said computer readable program code (a) to reconstruct an original picture data, for each of said pictures, having a number of real inputting bits;

(d) computer readable program code for computing, for each of said pictures, a remaining number of inputting bits after a previous picture in said first coded moving picture sequence signal is decoded by said computer readable program code (c) on the basis of said number of real inputting bits of said previous picture and said estimated number of inputting bits obtained by said computer readable program code (b);

(e) computer readable program code for transforming, on the basis of a scaling factor, said original picture data reconstructed by said computer readable program code (c) for each of said pictures into an objective picture data having a number of real outputting bits less than said number of real inputting bits of said original picture data;

(f) computer readable program code for encoding said objective picture data obtained by said computer readable program code (e) to generate a second coded moving picture sequence signal;

(g) computer readable program code for outputting said second coded moving picture sequence signal generated by said computer readable program code (f) at a target bit rate lower than said input bit rate of said first coded moving picture sequence signal;

(h) computer readable program code for computing an estimated number of outputting bits to be output by said computer readable program code (g) for said predetermined duration on the basis of said target bit rate of said second coded moving picture sequence signal;

(i) computer readable program code for computing, for each of said pictures, a remaining number of outputting bits after a previous picture in said second coded moving picture sequence signal is encoded by said computer readable program code (f) on the basis of said number of real outputting bits of said previous picture and said estimated number of outputting bits obtained by said computer readable program code (h);

(j) computer readable program code for computing, for each of said pictures, a target ratio of said remaining number of outputting bits computed by said computer readable program code (i) to said remaining number of inputting bits computed by said computer readable program code (d) before the original picture data is transformed by said computer readable program code (e); and (k) computer readable program code for computing said scaling factor on the basis of said target ratio computed by said computer readable program code (j) to control said target bit rate of said second coded moving picture sequence signal.

12. The computer program product as set forth in claim 11, wherein said computer readable program code (d) has:

(d1) computer readable program code for initializing said remaining number of inputting bits of said current picture on the basis of said estimated number of inputting bits;

(d2) computer readable program code for updating said remaining number of inputting bits of said current picture on the basis of said number of real inputting bits of the previous picture and said remaining number of inputting bits of the previous picture;

(d3) computer readable program code for repeating said computer readable program code (d2) for each of said pictures; and (d4) computer readable program code for repeating said computer readable program codes (d1) and (d3) at time intervals of said predetermined duration, and said computer readable program code (h) further comprising:

(h1) computer readable program code for initializing said remaining number of outputting bits of said current picture on the basis of said estimated number of outputting bits;

(h2) computer readable program code for updating said remaining number of outputting bits of said current picture on the basis of said number of real outputting bits of the previous picture and said remaining number of outputting bits of the previous picture;

(h3) computer readable program code for repeating said computer readable program code (h2) for each of said pictures; and (h4) computer readable program code for repeating said computer readable program codes (h1) and (h3) at time intervals of said predetermined duration.

13. The computer program product as set forth in claim 11, further comprising computer readable program code for repeating said computer readable program codes (b), (d), (h) and (i) for each of said pictures.

14. The computer program product as set forth in claim 11, wherein each of said pictures consists of a plurality of blocks, said computer readable program code (c) further having computer readable program code for deriving an original scaling factor from said first coded moving picture sequence signal, said computer readable program code (e) further comprising:

(e1) computer readable program code for dividing said original picture data for each of said picture into a plurality of block data respectively corresponding to said blocks;

(e2) computer readable program code for quantizing said block data for each of said blocks with said scaling factor; and (e3) computer readable program code for repeating said computer readable program codes (e1) and (e2) for each of said blocks within said picture to generate said objective picture data;

said computer readable program code (k) having computer readable program code for updating said scaling factor on the basis of said original scaling factor.

15. A computer program product comprising a computer usable storage medium having computer readable code embodied therein for transcoding a coded moving picture sequence signal, said computer readable code comprising:

(a) computer readable program code for inputting a first coded moving picture sequence signal at an input bit rate, said first coded moving picture sequence signal consisting of a series of pictures;

(b) computer readable program code for decoding said first coded moving picture sequence signal inputted by said computer readable program code (a) to reconstruct an original picture data, for each of said pictures, having a number of real inputting bits, and derive an original scaling factor;

(c) computer readable program code for transforming, on the basis of a scaling factor, said original picture data reconstructed by said computer readable program code (b) for each of said pictures into an objective picture data having a number of real outputting bits less than said number of real inputting bits of said original picture data;

(d) computer readable program code for encoding said objective picture data obtained by said computer readable program code (c) to generate a second coded moving picture sequence signal;

(e) computer readable program code for outputting said second coded moving picture sequence signal generated by said computer readable program code (d) at a target bit rate lower than said input bit rate of said first coded moving picture sequence signal;

(f) computer readable program code for computing a temporary scaling factor on the basis of said reconstructed original picture data to control said target bit rate of said second coded moving picture sequence signal; and (g) computer readable program code for correcting said temporary scaling factor computed by said computer readable program code (f) on the basis of said original scaling factor to derive said scaling factor for said computer readable program code (c).

* * * * *